United States Patent
Mann et al.

(10) Patent No.: US 12,331,727 B2
(45) Date of Patent: Jun. 17, 2025

(54) SYSTEMS AND METHODS FOR SMOOTHING AND STORAGE OF INTERMITTENT RENEWABLE POWER

(71) Applicant: BENNAMANN SERVICES LTD, Newquay (GB)

(72) Inventors: Christopher Mark Mann, St. Mawgan (GB); Tom Richard Taylor, Wadebridge (GB); Thomas William Bradshaw, Oxon (GB); Edward Richard Yorke Gleadowe, Falmouth (GB)

(73) Assignee: BENNAMANN SERVICES LTD, Newquay (GB)

( * ) Notice: Subject to any disclaimer, the term of this patent is extended or adjusted under 35 U.S.C. 154(b) by 36 days.

(21) Appl. No.: 18/035,680

(22) PCT Filed: Nov. 8, 2021

(86) PCT No.: PCT/IB2021/060328
§ 371 (c)(1),
(2) Date: May 5, 2023

(87) PCT Pub. No.: WO2022/097113
PCT Pub. Date: May 12, 2022

(65) Prior Publication Data
US 2023/0392581 A1    Dec. 7, 2023

Related U.S. Application Data

(60) Provisional application No. 63/111,266, filed on Nov. 9, 2020.

(51) Int. Cl.
F03D 9/17    (2016.01)

(52) U.S. Cl.
CPC ............... *F03D 9/17* (2016.05); *Y02E 50/30* (2013.01); *Y02E 60/16* (2013.01); *Y02E 70/30* (2013.01)

(58) Field of Classification Search
CPC . F03D 9/17; Y02E 50/30; Y02E 60/16; Y02E 70/30
See application file for complete search history.

(56) References Cited

U.S. PATENT DOCUMENTS

| | | | | |
|---|---|---|---|---|
| 4,118,637 A | * | 10/1978 | Tackett | ............... F03D 9/28 416/DIG. 4 |
| 7,178,337 B2 | * | 2/2007 | Pflanz | ............... F03G 6/067 60/641.2 |

(Continued)

FOREIGN PATENT DOCUMENTS

| | | |
|---|---|---|
| DE | 102008036100 A1 | 2/2009 |
| DE | 102008050244 A1 | 4/2010 |

(Continued)

OTHER PUBLICATIONS

International Search Report and Written Opinion dated Mar. 28, 2022 issued in International Patent Application No. PCT/EP2021/060328, 21 pages.

*Primary Examiner* — Pedro J Cuevas
(74) *Attorney, Agent, or Firm* — Rothwell, Figg, Ernst & Manbeck, P.C.

(57) ABSTRACT

There is provided an energy capture system. The system may comprise one or more rotor blades or solar panels and a compressor. The compressor is configured to be driven by the one or more rotor blades or solar panels to draw gas and to compress the gas, thereby producing a compressed material. The system further comprises a pressure receiver coupled to an output of the compressor and configured to receive the compressed material from the compressor. The system further comprises an energy recovery unit coupled to (Continued)

the pressure receiver and configured to receive the compressed material from the pressure receiver. The energy recovery unit is configured to generate mechanical and/or electrical energy using the compressed material.

20 Claims, 14 Drawing Sheets

(56) References Cited

U.S. PATENT DOCUMENTS

| | | | | |
|---|---|---|---|---|
| 7,856,843 B2* | 12/2010 | Enis | ............... | F25B 27/00 |
| | | | | 62/235.1 |
| 8,522,538 B2* | 9/2013 | Ingersoll | ............... | F03D 9/257 |
| | | | | 417/267 |
| 8,808,529 B2* | 8/2014 | McAlister | ............... | F24D 11/005 |
| | | | | 205/462 |
| 8,907,524 B2* | 12/2014 | Vandor | ............... | H02J 15/006 |
| | | | | 307/69 |
| 9,217,412 B2* | 12/2015 | Blake | ............... | F03D 15/00 |
| 9,260,018 B2* | 2/2016 | Vandor | ............... | F25J 1/0288 |
| 9,322,296 B2* | 4/2016 | Hugo | ............... | F03D 9/25 |
| 9,885,248 B2* | 2/2018 | Erämaa | ............... | F02C 5/12 |
| 10,247,168 B2* | 4/2019 | Gordic | ............... | F03C 1/007 |
| 10,408,128 B2* | 9/2019 | Mokheimer | ............... | F01K 17/025 |
| 10,577,248 B2* | 3/2020 | Harper, Jr. | ............... | C02F 9/00 |
| 11,473,499 B2* | 10/2022 | Mokheimer | ............... | C02F 9/00 |
| 2005/0115248 A1* | 6/2005 | Koehler | ............... | F17C 1/002 |
| | | | | 141/82 |
| 2007/0234749 A1* | 10/2007 | Enis | ............... | F25B 27/00 |
| | | | | 62/401 |
| 2011/0070510 A1* | 3/2011 | McAlister | ............... | F24D 11/005 |
| | | | | 205/462 |
| 2011/0289913 A1* | 12/2011 | Welch, Jr. | ............... | F03B 17/04 |
| | | | | 60/495 |
| 2012/0096845 A1* | 4/2012 | Ingersoll | ............... | F03D 9/28 |
| | | | | 60/408 |
| 2013/0032211 A1* | 2/2013 | Shaw | ............... | F03D 9/12 |
| | | | | 137/565.18 |
| 2013/0284608 A1* | 10/2013 | Blake | ............... | F03D 1/025 |
| | | | | 290/55 |
| 2014/0159371 A1* | 6/2014 | Hugo | ............... | F03D 9/28 |
| | | | | 60/659 |
| 2014/0190152 A1* | 7/2014 | Ingersoll | ............... | F04B 41/02 |
| | | | | 60/371 |
| 2014/0326597 A1* | 11/2014 | McAlister | ............... | C25B 15/00 |
| | | | | 204/274 |
| 2014/0333139 A1* | 11/2014 | Vandor | ............... | F01K 5/00 |
| | | | | 307/69 |
| 2015/0084407 A1* | 3/2015 | Vandor | ............... | H02J 3/28 |
| | | | | 307/9.1 |
| 2017/0341942 A1* | 11/2017 | Harper, Jr. | ............... | F01K 7/16 |
| 2018/0313325 A1* | 11/2018 | Gordic | ............... | H02K 7/1823 |
| 2019/0136832 A1* | 5/2019 | Crossley | ............... | F03D 9/257 |
| 2019/0353100 A1* | 11/2019 | Mokheimer | ............... | F22B 1/1815 |
| 2023/0175472 A1* | 6/2023 | Tauscher | ............... | F03B 13/06 |
| | | | | 290/54 |
| 2024/0246030 A1* | 7/2024 | Bush | ............... | G06Q 50/06 |

FOREIGN PATENT DOCUMENTS

| | | |
|---|---|---|
| DE | 102011107885 A1 | 1/2013 |
| DE | 102013207702 A1 | 10/2014 |
| WO | 2020225794 A1 | 11/2020 |

* cited by examiner

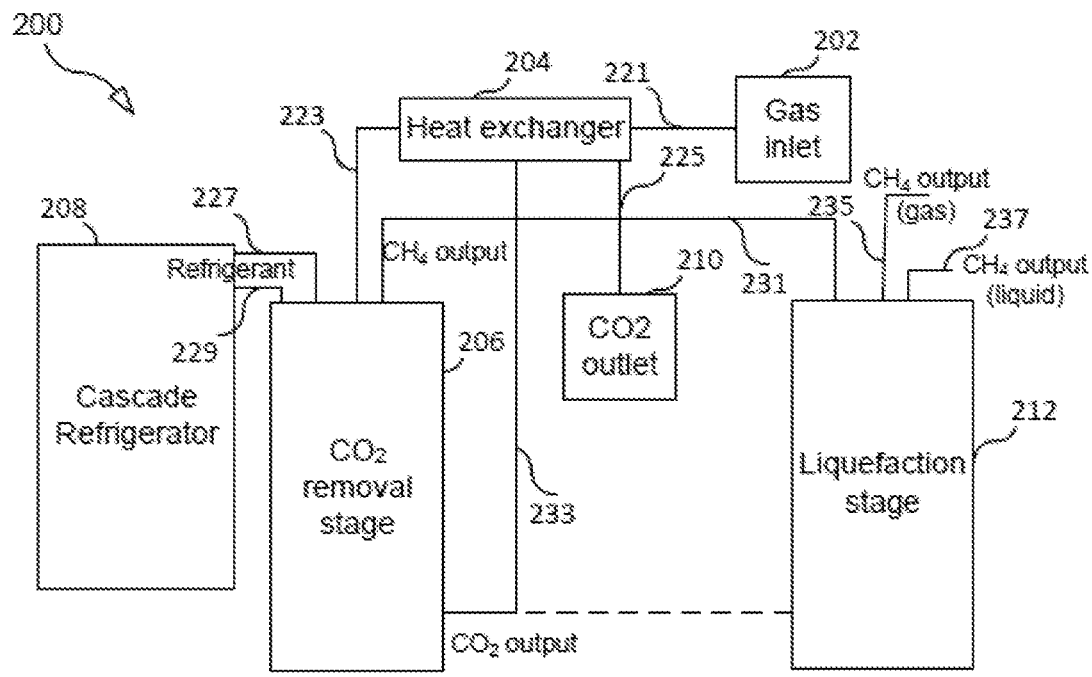
FIG. 2
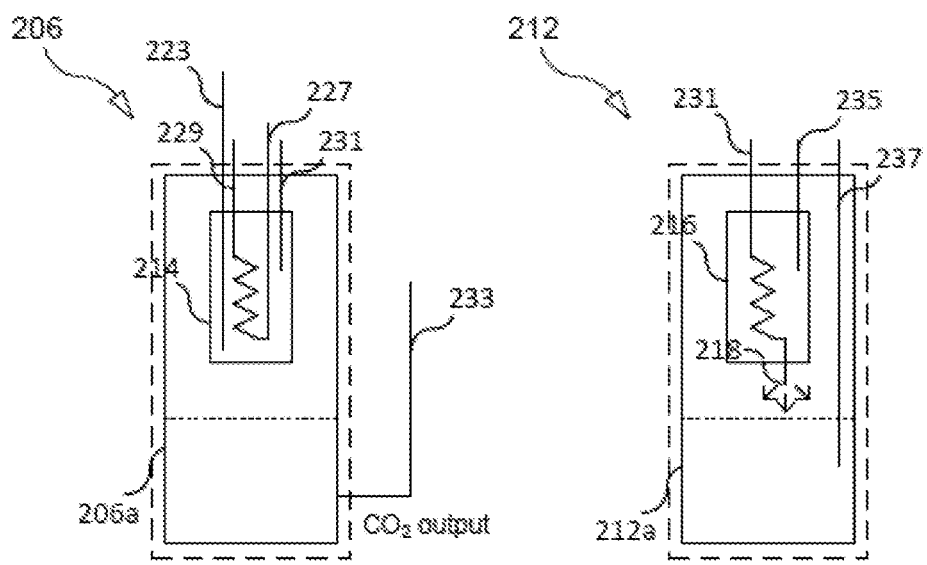
FIG. 2A  FIG. 2B

SYSTEMS AND METHODS FOR SMOOTHING AND STORAGE OF INTERMITTENT RENEWABLE POWER

CROSS REFERENCE TO RELATED APPLICATIONS

This application is a 35 U.S.C. § 371 National Stage of International Patent Application No. PCT/IB2021/060328, filed Nov. 8, 2021, designating the United States and claiming priority to U.S. Provisional Application No. 63/111,266, filed on Nov. 9, 2020, the disclosures of which are incorporated herein in their entirety by reference.

TECHNICAL FIELD

Disclosed are embodiments relating generally to systems and methods for energy capture and storage, and in particular, the effective use of intermittent renewable power.

BACKGROUND

Liquid cryogens can be generated in great quantities anywhere on the planet provided there is enough energy to power the necessary processes for converting gas into liquid, and enough gas to draw from the local environment to support the processes Some examples of liquid cryogens include liquid nitrogen, liquid methane, liquid CO2, liquid air, liquid argon, or other cryogenic materials. Aspects of gas processing and cryogen generation and processing are described in PCT/IB2020/054392, filed May 8, 2020, titled "Anaerobic Digester and Mobile Biogas Processing Plant." Liquid cryogens or pressurized gas can be stored in low cost containers that can be efficiently scaled as the material used to make the container per unit volume typically decreases exponentially.

Renewable energy sources, including wind, solar, and tidal sources for example, can be used to generate energy at high levels. However, the availability of such sources is often intermittent or inconsistent, for instance, due to environmental factors.

SUMMARY

Certain challenges exist with effectively capturing, storing, and using energy from renewable sources.

According to some embodiments, there are provided systems and methods for the enhanced capture, smoothing, and storage of intermittent renewable energy through the compression of gas, and in some embodiments, generation of cryogenic liquid. When required or otherwise needed, the stored energy can be recovered through expansion or re-gasification and expansion. In certain aspects, by combining disclosed processes with a combustion engine it is possible to generate useful power from the otherwise wasted heat from the engine. This combination may result in a useable power output greater than that produced by the sum of the individual components.

In one aspect, there is provided an energy capture system. The system comprises one or more rotor blades and a compressor, wherein the compressor is configured to be driven by the one or more rotor blades to draw gas and to compress the gas, thereby producing a compressed material. In certain aspects, the gas may be drawn directly from the local environment or from a gas source. The system further comprises a pressure receiver coupled to an output of the compressor and configured to receive the compressed material from the compressor and an energy recovery unit coupled to the pressure receiver (or directly to the compressor) and configured to receive the compressed material. The energy recovery unit is configured to generate mechanical and/or electrical energy using the compressed material, such as a compressed gas.

In another aspect, there is provided a method for energy recovery, comprising the steps of using one or more rotor blades of a wind energy system to drive a compressor, providing compressed gas from the compressor to a pressure receiver; and recovering energy using compressed gas from the pressure receiver. According to embodiments, one or more wind turbines are used as part of a wind energy system.

In another aspect, there is provided an energy capture system. The system comprises one or more solar cells and a compressor. The compressor is configured to be powered by the one or more solar cells to draw gas and to compress the gas, thereby producing a compressed material, such as compressed gas or liquid cryogen. The system further comprises a pressure receiver coupled to an output of the compressor and configured to receive the compressed material from the compressor, as well as an energy recovery unit coupled to the pressure receiver and configured to receive the compressed material, or a material derived from the compressed material such as boil off gas, from the pressure receiver. The energy recovery unit generates mechanical and/or electrical energy using the compressed gas.

In another aspect, there is provided a method for energy recovery, comprising the steps of: using one or more solar cells to drive a compressor; providing compressed gas from the compressor to a pressure receiver; and recovering energy using compressed gas from the pressure receiver.

In another aspect, there is provided a system. The system comprises a renewable and intermittent energy source; a liquefier configured to generate a first cryogen using energy from the energy source; first cryogen storage; a liquefaction stage for generating a second cryogen from biogas and using the first cryogen; and second cryogen storage. The system further comprises a first power generation stage configured to generate electricity using the second cryogen, wherein the first power generation stage generates heat waste; and a second power generation stage configured to generate mechanical and/or electrical power using a gas and the heat waste.

In another aspect, there is provided an energy capture and generation method. The method comprises the steps of generating and storing a first cryogen using a renewable and intermittent energy source, generating and storing a second cryogen using biogas and the first cryogen, generating electricity using the second cryogen; and generating electricity using a gas from a cryogen store and heat waste produced during the generation of the electricity using the second cryogen.

In another aspect, there is provided a method for energy capture and generation. The method comprises generating energy, creating a first cryogenic material using the energy, processing biogas to create a second cryogenic material; and using second cryogenic material to power an engine.

In another aspect, there is provided a method for energy capture and generation. The method comprises generating a cryogenic material using intermittent renewable energy; generating electricity and heat waste; passing the cryogenic material through a heat expander using the heat waste; and using the high-energy pressurized gas to generate power.

In some embodiments, an anaerobic digester or other biogas source may be used. For instance, the anaerobic digester or source may provide input gas to one or more of the compressors described above, or as a biogas for gas processing and generating cryogenic materials. In certain aspects, the provided biogas is methane-enriched, for instance, through the use of a semi-permeable membrane.

BRIEF DESCRIPTION OF THE DRAWINGS

The accompanying drawings, which are incorporated herein and form part of the specification, illustrate various embodiments.

FIG. 2 illustrates a system of biogas separation and methane liquefaction according to embodiments.

FIG. 2A illustrates a carbon dioxide ($CO_2$) removal unit according to embodiments.

FIG. 2B illustrates a liquefaction unit according to embodiments.

DETAILED DESCRIPTION

Figure 1:
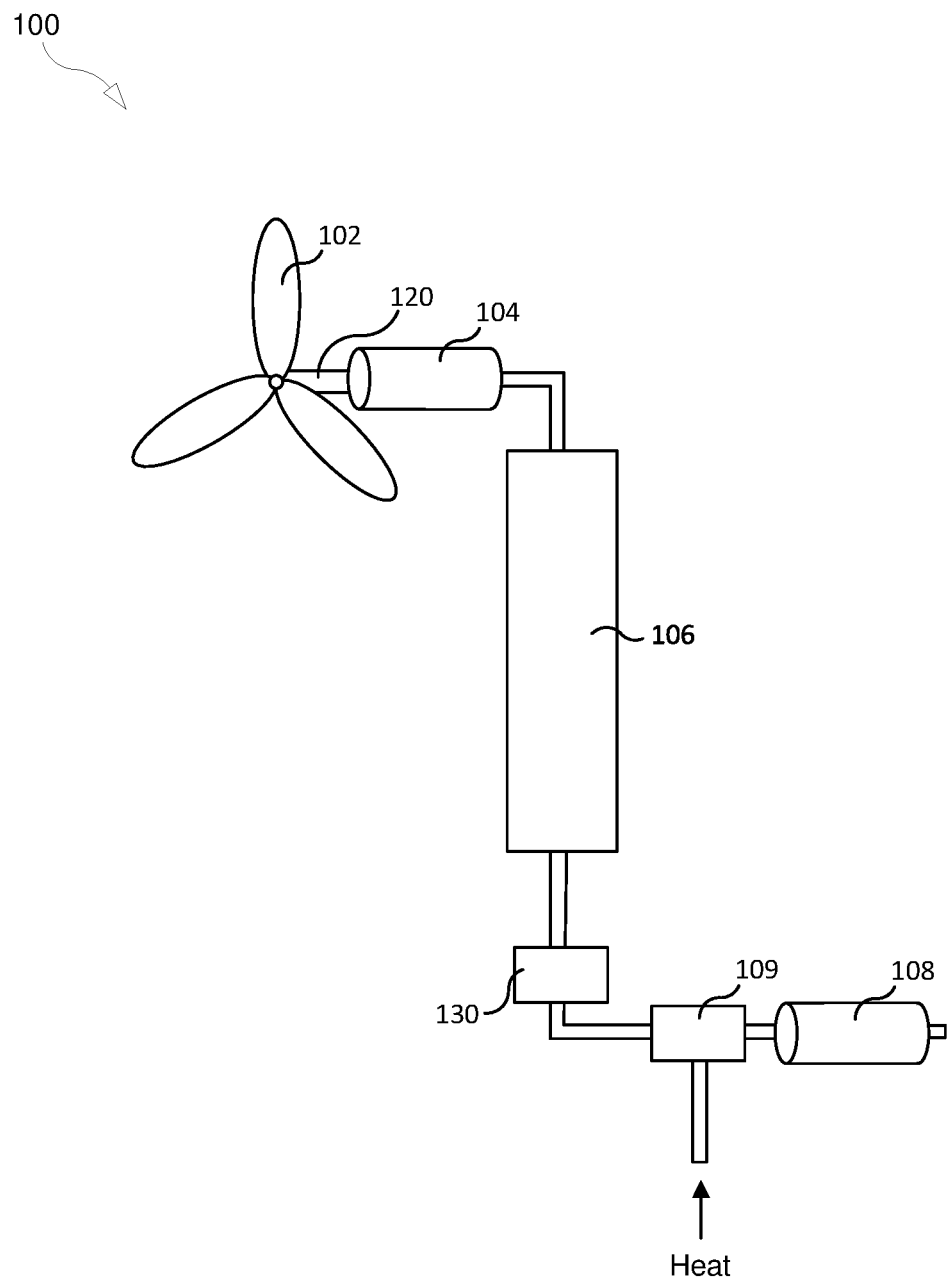
FIG. 1 illustrates a system according to embodiments.

In some embodiments, renewable energy (e.g., solar energy, wind energy, or tidal energy) can be stored by using the renewable energy to convert a gas into a liquid, such as a liquid cryogen, or a pressurized gas, that is stored for subsequent use. When needed, the stored liquid or gas may be used as a source for a power generator. In certain aspects, the liquid cryogen or gas may be used for processing another material, such as biogas. Additionally or alternatively, heat generated in one stage or process may be recovered and then used for other processes and/or power generation with improved efficiency.

According to embodiments, and in the case of a cryogenic liquid fuel such as liquid methane, there are at least two mechanisms by which energy can be recovered. For instance, the cryogenic liquid can be used directly in an engine (or other direct generator) as a fuel. Alternatively, or additionally, the cryogenic liquid can be expanded to a pressurized gas that can be used to drive an expander. That is, a system may use both mechanisms. In certain aspects, the expander can effectively operate as the opposite of a compressor. High-pressure gas (e.g., from a cryogenic liquid or pressurized gas storage) entering an expansion stage can drive a turbine, pistons, or other mechanism, and leave the stage as a low pressure, lower temperature gas. The driving of the turbine or other mechanism generates mechanical and/or electrical power according to embodiments.

As an example, when energy is required or needed, a liquefied gas (e.g., liquid methane) stored in a storage can be converted back to a high-pressure gas, optionally heated, and passed through an expander, which functions as a generator. In this respect, the high-pressure gas can be used for generating a power, either directly from storage of compressed gas or from boil off of a cryogen. In some examples, this can comprise putting the high-pressure gas into the output of a compressor and running the compressor backwards to drive a motor. Other types of expanders could include, for example, gas turbine pressure engines, or pressure-driven piston engines. Any device that can generate mechanical energy (and hence electrical energy) may be used as the expander according to embodiments. In some embodiments, an expander may be part of a refrigeration systems where the expanders takes work out of the fluid and produces cooling. In certain aspects, an expander may be a device that can produce refrigeration.

The round-trip energy efficiency of gas-energy conversion processes in isolation, however, may be relatively low (e.g., 10-30%) in some cases. However, if the high-pressure gas (e.g., methane) is further heated by passing it through a heat exchanger before entering the expander, the efficiencies can be improved (for example 60-80% efficiency in some instance). Typically, the energy required to liquefy methane is of the order of 1 kWh per kilogramme. This, compared to the chemical energy of the methane itself, is relatively low. Methane has an energy density of 55 MJ/kg which equates to 15.5 kWhh. Typical efficiencies when converted to mechanical power using a combustion engine are 45% yielding 6.2 kWh with the remainder being released as high grade heat in excess of 90 C.

According to embodiments, significant quantities of biogas can be generated from cut grass and other biomass such as cow slurry and converted into its constituent components namely, biomethane, carbon dioxide, and water. Examples are shown, for instance, in FIGS. 11 and 11A. A small quantity of hydrogen sulphide is also created, but as this is highly toxic and of little commercial value, this is typically stripped out and the elemental sulphur returned to the environment.

The separation of the biomethane and carbon dioxide can involve compression and filtration, which is an energetic process. In some cases, the energy required for the process can be generated by using some of the biomethane as fuel. The overall process design may be configured to minimize the biomethane losses through this process, which may become a driving factor in the overall commercial viability of the process. Fortunately, the value of the biomethane once processed is high, ensuring that this is usually the case, but anything that can improve the processing site power availability and output, overall efficiency and thereby product yield will improve profitability and is therefore highly desirable. According to embodiments, energy for biomethane and CO2 separation can be provided from intermediate sources either directly, or from stores of compressed gas or liquid cryogens as described herein. Additionally, liquid cryogens may be used directly in the process, for instance, as described in connection with FIGS. 2, 2A, 2B, and 2C.

Studies of renewable energy resources such as wind and solar indicate that very high energy levels can be captured. On a small scale, this energy may be stored in a chemical battery or capacitor, for example. However, such techniques quickly become too expensive due to the lack of volume scaling. In addition to the inability to scale, the peak energy of both solar and wind, which can be very high, presents a serious limitation for batteries as there are fundamental chemical and physical limits to the rate that they can be charged. To fully exploit the availability and scale of intermittent renewable energy, a low cost, highly scalable, and efficient means of capturing, smoothing, accepting, storing and efficiently recovering the energy is provided according to some embodiments. One or more processes are provided where the above is achieved by the integration of a number of approaches.

Accordingly, in some embodiments, spare renewable energy generated as excess demand, for instance, during windy or sunny periods, can be used to create a liquid cryogen or a pressurized gas, such as air, nitrogen, or other cryogens that can be used later as a fuel, for subsequent material processing, or to generate energy directly.

Renewable energy sources and the resultant power are typically intermittent, and this introduces many challenges for a centralised electrical power distribution network. A non-intermittent renewable power solution can be implemented that uses the generation and storage of liquid biomethane created from abundant biomass waste such as grass cuttings and animal manure processed using anaerobic digestion. Biomethane can be used to fuel conventional combustion engines and new split cycle engines are being developed that will provide up to 60% efficiency. However, in such a scenario, the remaining 40% of energy may still be lost as heat.

In order to achieve a high round trip efficiency from liquid nitrogen back to ambient temperature nitrogen gas, heat may be required to both boil the liquid nitrogen and heat the resulting nitrogen gas before it enters the expander. In order to achieve high energy storage and recovery efficiencies the liquefaction and expansion process may require large quantities of high-grade waste heat. If this is not available, then large capacity high grade cold and high grade heat stores may be needed. Ultimately, therefore, it is the capacity of these thermal stores that could limit the total liquid cryogen energy storage capability and scalability. As they are generally realised using high specific heat materials stored in insulating containers, this becomes a limiting factor. It also greatly complicates the process.

According to embodiments, energy storage can be based around the storage of liquid methane which can be achieved indefinitely (e.g., zero boil-off or ZBO) with no venting of methane gas. This energy can be recovered and converted into power and heat using a conventional combustion engine, such as an internal combustion or external combustion engine.

In certain instance, for instance when the primary requirement is mechanical or electrical power and there is no local requirement for the heat, a store of liquid cryogen combined with an expander provides an opportunity for dramatically increasing the energy recovered from the combination of a combustion engine and the liquid cryogen energy storage of intermittent renewable energy. When considering the "true value" of a power source, the "quantity" of energy delivered is often not the driving factor. Other important factors can include its availability, including where, when, how much, and for how long. In terms of cost, how much energy and time is used in the power source creation or capture, how easily can it be scaled and adapted, how much material is used in its construction, how long it lasts, how much maintenance it requires, and whether it can be recycled at the end of its life can all be factors. In terms of resilience, factors can include the infrastructure required to capture and distribute the power, as well as the time period it takes to shut down or start up.

Considerations of existing power sources can include one or more of the following.

Combustion engines can be used. They can provide more than enough power for most everyday local requirements and can be left running for days or even weeks at a time, and then refilled in minutes. They can be scaled to very large outputs, offer good longevity, often require little maintenance, and can be recycled at the end of their life. A sustainable and widely available fuel can aid the combustion engine as very good power solution. With the advent of liquid biomethane, this is a promising source.

Natural gas, oil and, and coal powered centralised power generators require a complicated and expensive distribution network. The plant and infrastructure require continuous maintenance which is difficult and expensive to modify. Like the combustion engine, its fuels must be transported to its point of use which incurs additional cost and makes it geographically reliant. A positive is that the overall efficiency can be quite high and the infrastructure has already been paid for. A sustainable means of fuelling would also provide an improvement.

Renewable resources such as solar, wind, and tidal are attractive options. The outputs can be very high and their cost can be quite low, but in terms of availability the current lack of any scalable convenient storage capability means that they are highly intermittent and even when "on" require a distribution network which greatly limits where they can be deployed. The intermittency of the captured resources means they may have downsides with respect to reliability and geographical dependence without appropriate techniques. With respect to the environment, they are excellent options.

When the above factors are taken into account, a de-centralised, locally distributed power system that uses sustainably fuelled combustion engines can provide an excellent solution for power needs. If it could be integrated into a practical and cost-effective energy storage capability that solved the intermittency of renewable resources, such a system would be even better. If the sustainable fuel can be aggregated anywhere in the world with minimal infrastructure requirements that can be manufactured locally from locally sourced materials then a solution to the current climate crisis is enabled. Aspects of the present disclosure describe systems and devices that can meet the foregoing needs and provide optimal power solutions.

Fugitive methane and biomethane refined from the biogas that is created when animal waste and biomass are anaerobically digested can be carbon negative and carbon neutral respectively. In particular, the carbon dioxide equivalent factor (over a 20 year period), $CO_2e_{20}$ for fugitive methane is −86 when burnt and −89 when used to replace fossil fuels. As such, the physical and chemical properties of both fugitive and biomethane are unique in that it can be used to directly replace fossil fuels as a fuel for all combustion and heat engines and also direct burning heating systems with very little adjustment of infrastructure.

As either a compressed gas (or preferably cryogenic liquid), its volumetric and specific energy density is sufficiently high that it provides similar if not increased autonomy over liquid fossil fuels it can replace such as petrol, diesel, propane, natural gas, butane and kerosene. It can be used in jet and rocket engines offering superior performance Uniquely as a fuel for inter-planetary transport, it can be manufactured via photosynthesis at the destination planet. Methane captured from regenerative bio-resources has the potential to replace all fossil fuels on a global scale solving the current climate emergency.

The lack of a suitable storage solution has resulted in the geographic positioning of renewable energy resources such as solar and wind at high power grid injection nodes within the electrical grid networks. Wind and solar resources are highly intermittent in nature on short, medium, and long timescales.

Wind is often either very low speed or subject to short period extreme gusts. In the case of the windless periods, a storage capability of days or even weeks might be required in order to continue output from the site. In this instance, the generation of liquid cryogens offers a solution as they possess a very high energy density. In the case of wind gusts, the issue is first of efficient energy capture, but then the rate at which the energy can be stored. This is because the energy in wind varies in according to the cube of the wind speed. During a short gust, the instantaneous wind speed might increase by a factor of four in which case the energy available increases by a factor of sixty-four. Any wind energy capturing system must be able to ramp up its capturing capability in a very short time frame but this is only of use if the storage capability can react on a similar timescale.

Neither of these requirements are met by the current electrical power generating wind turbines. This is because the electrical generators efficiency rapidly diminishes as a function of rotational speed, current and torque and this results in significant heating generated in the generator windings that will result in generator burn out. Therefore, conventional electrical generation wind turbines are designed to spill the wind during strong gusts meaning that significant energy is not captured. To protect the generator it may even be necessary to slow down the turbine blades by applying a friction brake. These too can overheat and break.

The electrical power grid cannot store any appreciable amount of energy and its transmission lines and transformers cannot accept such large variations in power and therefore have to reject the power often to resistive heating elements or ballast resistors. To further compound the issue, the use of chemical batteries to store the excess energy is limited by both the limited charging rates, which is a fundamental property of battery's chemistry physical operation conditions and the linear cost of scaling.

According to embodiments, methods and systems are provided for wind energy capture and storage where instead of generating electrical power, the wind rotor turns a gas compressor. In certain aspects, the system is able both able to quickly respond to the change in available power but also has a speed and torque versus efficiency characteristic that is able to provide a protective response to the increased power levels and yet also be able to store the energy instantaneously by correspondingly pumping the gas at a faster rate and higher pressure. This results in a more efficient energy capture where even the instantaneous peak power of a gust can be captured but also provides a powerful smoothing effect of otherwise unmanageable power outputs. While embodiments use direct operation of a compressor from the rotors, in some embodiments, wind mills may generate electricity that powers a compressor.

Referring now to FIG. 1, a system 100 is provided according to some embodiments. The system 100 may be used, for instance, for wind energy storage and smoothing.

Figure 11:
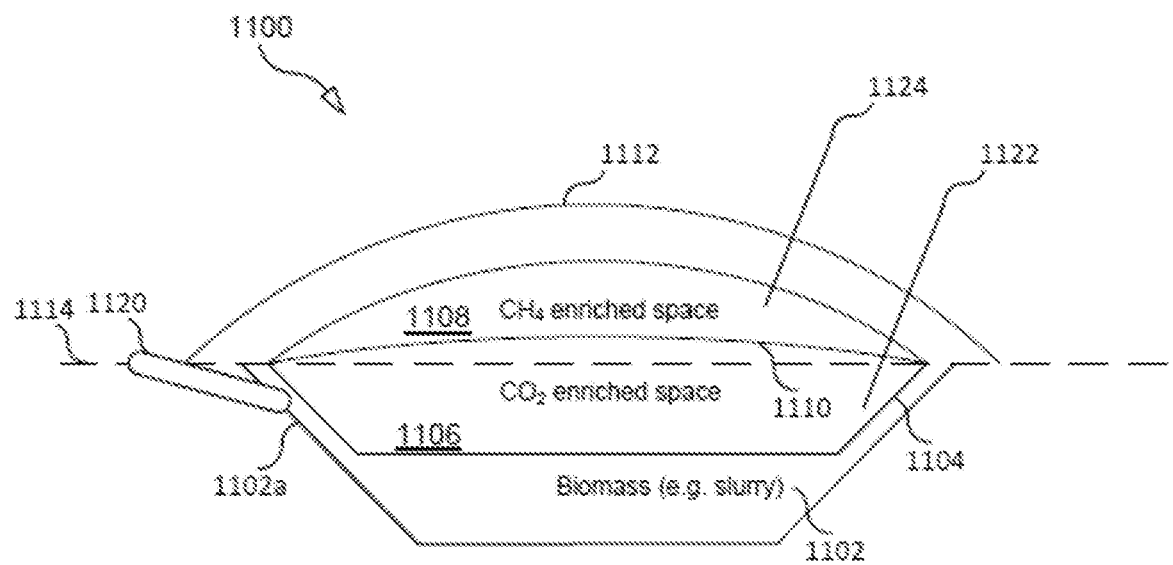
FIGS. 11 and 11A illustrate anaerobic digesters and storage containers according to embodiments.
Figure 11A:
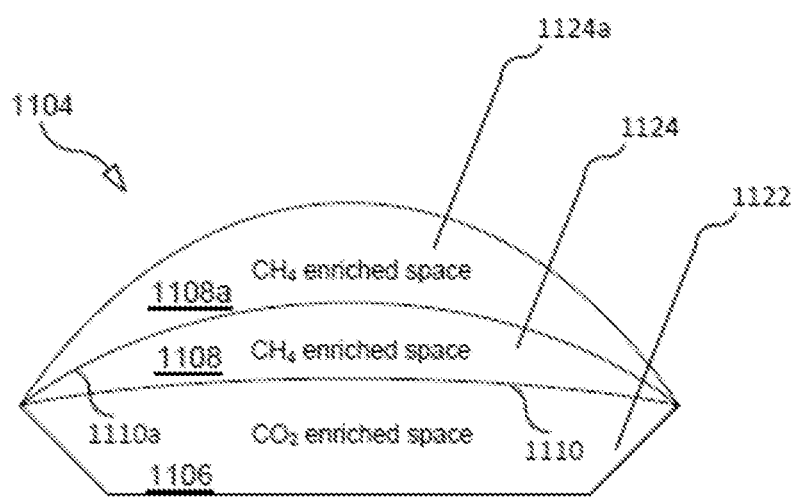

In this example, rotor blade 102 is connected to a compressor 104. One example of a compressor 104 is a rotary vane compressor, where the blade is attached to a drive shaft 120 of compressor 104. Other compressors and configurations may be used. In this example, gas is drawn in by the compressor 104 and compressed based on the energy from the windmill. According to embodiments, the gas is air. However, other gases, including methane or nitrogen (e.g., from a store of material), may be used instead. In some embodiments, air or other gases are drawn directly from the local environment. In some embodiments, gas may be drawn from gas storage. For instance, biogas may drawn from gas storage, including from an anaerobic digester as shown in FIGS. 11 and 11A. In some embodiments, the biogas may be methane-enriched. Where biogas is used, the system 100 may provide compressed biogas to high pressure storage, which can subsequently be used for energy re-capture, liquefaction, further biogas processing, and or driving a combustion engine (either locally or when taken off site).

In certain aspects, the rotary vane compressor may be used as a rotary action compressor. The rotary vane compressor has the benefit of quick response, low noise, and high efficiency. In some embodiments, the compressor 104 may compress the gas from atmospheric pressure to 5-15 bar. However, other pressures may be used. In some embodiments, instead of the rotary vane compressor, a reciprocating compressor may be used. The reciprocating compressor has the advantage of providing higher compression ratios such as 200 bar, which allow higher energy storage capability.

In the system 100 shown in FIG. 1, the compressor 104 may convert the gas into a liquid or a pressurized gas, and this converted liquid or gas from the compressor 104 feeds into a pressure receiver 106, which acts as a storage unit. In some embodiments, the pressure receiver 106 may be constructed as the mast, or a portion of the mast, that supports an air mill. According to embodiments, when the storage/receiver 106 is at a maximum pressure or when power needs to be generated from the system 100, a regulator or pressure relief valve 130 may be operated to feed gas to an expander 108 or other energy recovery unit. The expander 108 is configured to recover the mechanical power originally provided by the rotor blade 102. According to embodiments, a pressure gas motor may be used, which may be referred to as a pneumatic motor, air motor, or compressed air engine. Electrical energy may be generated by the expander 108 in embodiments, for instance, based on the mechanical power. In some embodiments, the gas may be compressed gas from the storage 106. In certain aspects, the gas may be boil-off gas from a liquid cryogen. In some embodiments, storage 106 may store a liquid cryogen based on the compressed gas, for instance, by incorporating a liquefaction element as described in FIGS. 2, 2A, 2B, 2C, and 4. Different elements of the system 100 may be connected by fluid or gas lines. In some embodiments, for example where methane is used as a the compressed material, energy may be recovered from the compressed material using a combustion engine.

In a perfect system, the energy recovered from this process of compression and expansion would be 100% efficient, however, in the real world there may be losses such as friction losses in the compressor 104 and friction losses of the gas occurred when the gas travels in the lines to and from the receiver 106.

If the compressed (or liquefied) gas in the receiver 106 is allowed to cool between its compression and expansion then there are also thermodynamic losses as the gas emanating from the expander 108 will now be colder than the gas entering the compressor 104, or colder than the gas leaving the receive 106. This may cause the mechanical efficiency of the overall system 100 (i.e., the energy recovered at the output of the expander 108) to be reduced in some respects. In some instances, however, this may be an advantage when a cold medium is required to process other gases e.g., to freeze out the moisture in biogas. In other words, in some embodiments, if the gas retrieved from the receiver 106 is cold, this cold gas may be used for cooling. Examples of certain gas processing and/or liquefaction devices are illustrated in FIGS. 2, 2A, 2B, and 2C.

On the other hand, if the compressed or liquefied gas in the receiver 108 is maintained at or heated back to the temperature that the gas had when it left the compressor 104, then the efficiency of the compression-expansion process can be improved (e.g., 70-80%). Furthermore, if the temperature of the gas can be further increased, then there can even be a net gain in the mechanical energy available at the output of the expander 108. Accordingly, in some embodiments, heat may be fed into a heat exchanger 109 and the gas may pass the heat exchanger 109, be heated, and then provided to the expander 108.

As discussed above, the cooling of the gas in the receiver 106 or lack of available heat to either maintain the temperature of the compressed gas or to supplement the lost heat in the receiver 106 may result in low efficiency. But there may be a scenario where the advantage of the availability of a smooth power output on demand outweighs the loss of efficiency. For example, when the energy capture enabled by the dynamic ability of the compressor 104 increased in time with a powerful sudden gust or step rise in wind speed coupled with the compressors ability increases its flow to the receiver 106 and thereby store and smooth the wind energy between gusts, more sensible power can be retrieved and there are then several advantages, even in this simplest of operation modes.

There are additional features that may make using a rotary vane compressor as the compressor 104 attractive for certain applications. First, operating flow variations of at least an order of magnitude can be achieved. The mass flow of the compressor increases linearly with rotation speed. Second, a natural braking capability can be introduced by partially restricting the output flow which introduces a back pressure thereby increasing the output pressure. A rotary vane output delivery pressure can be varied from typically 5 to 15 bar introducing a braking mechanism. Third, without the need for an electric motor, the rotary vane assembly required for an air mill application is extremely robust, simple in configuration, and cheap to mass produce reducing the cost of wind energy retrieval as there is no need for expensive high conductivity materials such as copper.

One benefit of embodiments is that compressors are generally lighter, and less expensive than, electric generators, and thus the embodiments provide relatively cheaper ways to store and recover intermittent energy while generating equivalent—or greater—energy.

In order to capture more wind from a site it is often desired to have an array of wind turbines, often referred to as a wind farm. With respect to generated electrical AC power for input into a power grid for distribution, then the output powers of the turbines have to be combined and this requires complex and expensive power electronics. In some embodiments, wind turbines (e.g., of a wind farm) may be configured such that they do not directly interact electrically due to back electromotive forces when the windings of the generators are not synchronised. Wind turbines can produce AC power at different phases and frequencies that often need to go through power conditioning electronics. The receiver 106 can act as a summation device (or battery) so that it can be a synchronised generator, simplifying the whole assembly.

For an array of wind turbines that use pressurised gas as the transport and storage medium, which can be referred to as air mills, each charges its pressure receiver independently and dynamically until either the maximum receiver output pressure is achieved or power output is required or needed from the a single master expander, according to some embodiments. The expander 108 may be sized for maximum power output and efficiency. The combination of a number of air mills outputting towards a single expander has the benefit of further cost reduction but also further smoothing and increase in storage capability.

Figure 3:
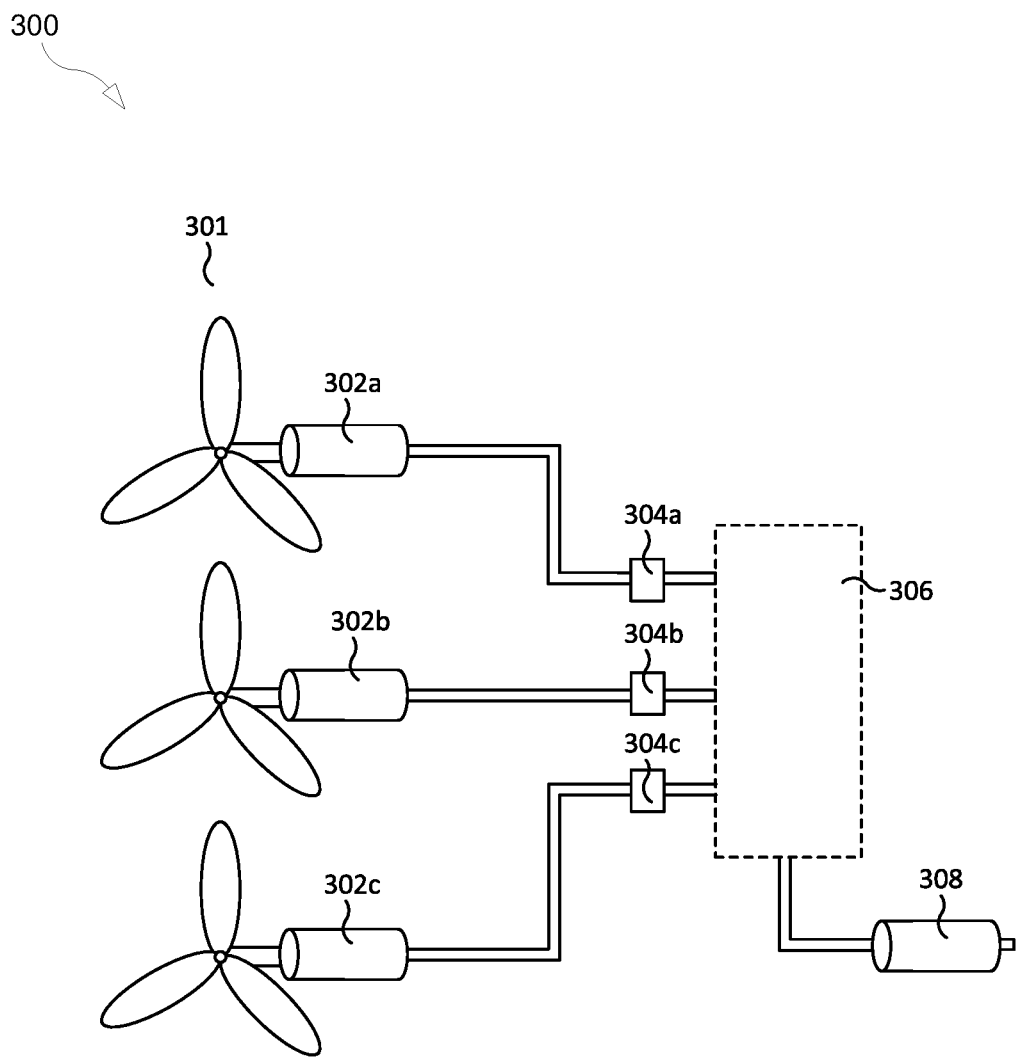
FIG. 3 illustrates a system according to embodiments.

FIG. 3 shows a system 300 including multiple air mills for generating energy. The system 300 may combine the pressurised or liquefied gas obtained by compressing or liquefying gas using the wind energy collected from an array of turbines 301. In some embodiments, they are combined using via non-return valves 304a-304c, which are coupled to the respective compressors 302a, 302b, and 302c. In embodiments, the compressors are powered by the respective air mills, for instance, as describe with respect to system 100. In some embodiments, the pressurized gas or liquefied gas may be combined in an optional receiver 306 or other storage element before passing to expander 308 or other energy recovery unit. In some embodiments, the expander 308 may be any energy recovery unit. In this example, a single expander 308 functions based on the inputs from multiple air mills of an array 301. While three turbines are used in array 301 in this example, different numbers may be used, including two or more. Though not illustrated, one more heat exchangers may be implemented between components. For instance, a heat exchanger may be used before the input of expander 308 or other energy recovery unit. As described with respect to FIG. 1, different devices may be used for energy recovery from the compressed material, including pneumatic motors and combustion engines, for example.

Figure 4:
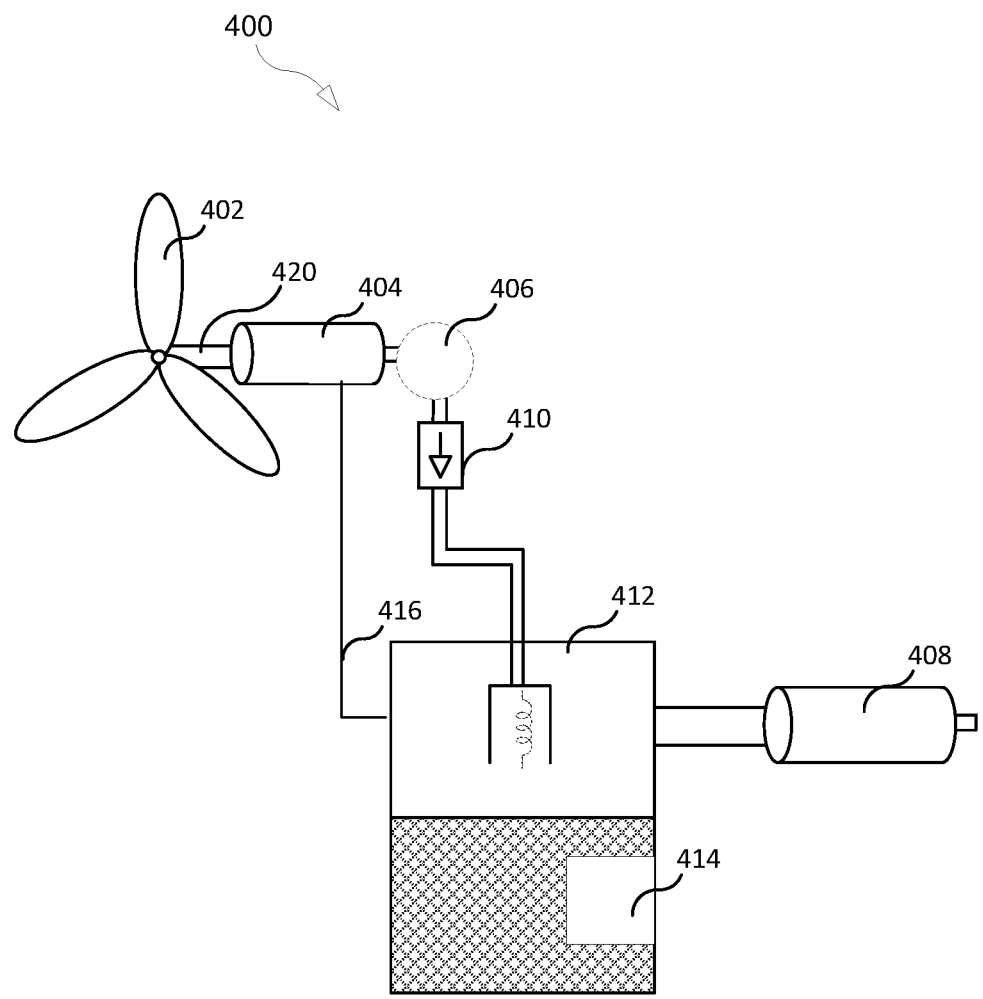
FIG. 4 illustrates a system according to embodiments.

According to embodiments, compressed gas can also be liquefied. This may be, for example, where the gas is passed through a Joule Thompson device or other liquefaction element. Processes that include liquefaction or other processing are described, for example, with respect to FIG. 4. In this example, FIG. 4 illustrates a system 400 that converts air or another gas to pressurized gas or a liquid cryogen. For instance, a compressor 404 may be driven by one or more wind mills or rotors 402, where a compressed gas is then stored. For instance, storage 406 may be provided. This may be similar to the processes described in FIGS. 1 and 3, which use receive/storage 106, 306.

The system 400 can also be used to generate liquid cryogens, such as liquid air, according to embodiments. Wind (or solar, or tidal, etc.) is used to power a liquefaction process in a liquefaction stage 412, which may also act as storage in some embodiments. The compress gas is passed to the liquefaction stage 412 comprising a liquefaction element and storage, such as a storage tank or other cryogenic storage vessel. At this stage, the compressed gas is liquefied. The gas may be passed directly from compressor 404, or provided to an intermediate storage 406, which may be optional in some embodiments. Storage 406 may act as a buffer, in certain respects. Aspects of liquefaction are further described with respect to FIGS. 2, 2A, 2B, and 2C. The storage element may be interposed between the compressor 404 and liquefaction stage 412 for holding compressed gas prior to liquefaction. Control of the gas between the compressor 404, liquefaction stage 412, and/or intermediate compressed gas storage may be controlled by one or more one-way valves 410. Such valves 410 may be disposed in multiple locations along the gas path for flow control.

Subsequently, gas derived from the liquid cryogen can be expanded to generate power. Even though FIG. 4 shows converting the wind energy into the pressurized gas, in some embodiments, solar energy or tidal energy may be used to power a liquefaction process. When the liquefied gas is returned to gas, the energy generated during the de-liquefying process can be used for generating power. For example, according to embodiments, air is compressed in a compressor 404 and then liquefied via a Joule Thompson process (or other process) in a cryogenic tank 412. When it boils off, it powers a recovery system (e.g., expander, engine, or any other energy recovery unit 408). A heater 414 may be activated to increase boil off, for instance, for on demand power. Other cooling units may be used, including a Brayton cycler, cryocooler, or any other refrigeration cycle. In embodiments, one of more of the processes described with respect to FIGS. 1, 3, 5, and 6 may be implemented. For instance, the compressor 404 may be driven by rotors 402 using shaft 420, or energy from a solar source. Flow may be controlled by a non-return valve 410 in some embodiments.

System 400 may be used to process various materials. For instance, air or other gasses may be drawn from the local environment and liquefied. In some embodiments, however, the processed gas may be drawn from a gas storage, such as biogas from an anaerobic digester as described in FIGS. 11 and 11A. Accordingly, the wind mill (or solar, or tidal) energy source is used to power the generation of liquid biomethane. In embodiments, the renewable energy source drives compressor 404 or a liquefaction unit, such as a refrigeration cycle. In certain aspects, the biogas used by system 400 may be methane-enriched. Methane enrichment may occur at the anaerobic digester, or may be done at the system 400. For instance, system 400 may have a semipermeable membrane that is selectively permeable to methane and $CO_2$. The compressed gas (e.g., from compressor 404 or an intermediate storage device) may be passed through such a membrane before liquefaction 412.

In some embodiments, gas from the storage tank may be passed back to the compressor 404 via a feedback line 416 for additional processing. In this manner, the process may be performed iteratively to generate increasingly pure biomethane. Venting from the liquefaction stage 412 may be controlled by one or more valves. Additionally, liquid methane may be drawn from the reservoir as well. When available (e.g., when processing biomethane), the processed materials may be used to directly power an engine. For instance, power unit 408 may be a combustion engine that runs off the processed materials.

When stored as a liquid, the energy density of cryogens can be very high. Typically, liquid air for example requires approximately 1 kWh/kg to liquefy. If the liquid air is allowed to then boil the compressed cold air used to drive an expander approximately 20-30% of the energy used to liquefy it can be recovered. However, if additional heat is available and the air is heated to 90 C before passing through the expander 108, 408, approximately 70-80% of the liquefaction energy can be recovered. As 1 kg of liquid air takes up approximately one litre of volume then nearly a megawatt hour of power can be stored in a space of one metre cubed. Over 1000 lead acid car batteries would be required to provide a similar energy storage capability.

According to embodiments, the described systems that that use wind energy and devices may be implemented using solar energy and devices, or vice-versa.

As with wind, solar energy captured through photovoltaic cells is both widespread and abundant but also intermittent due to night, clouds, and seasons. Clouds present a similar problem for grid operators as gusts do for wind, in that the power output from a solar array can fluctuate widely over a very short period of time that could be 10's of seconds to hours according to the nature and density of cloud shadows crossing the array. Also, the power varies dramatically between night time and day time and sunny and rainy days. There is also, a dramatic variation between output during the summer months and winter months that is often out of phase with daily energy demand at the locality.

Therefore, as with wind there is a need to both smooth output over short periods and also store energy over longer periods and a similar approach can be adopted for a solar cell through the use of compressed gas, a compressed gas receiver, and an expander. An example of this is shown in FIG. 5.

Figure 5:
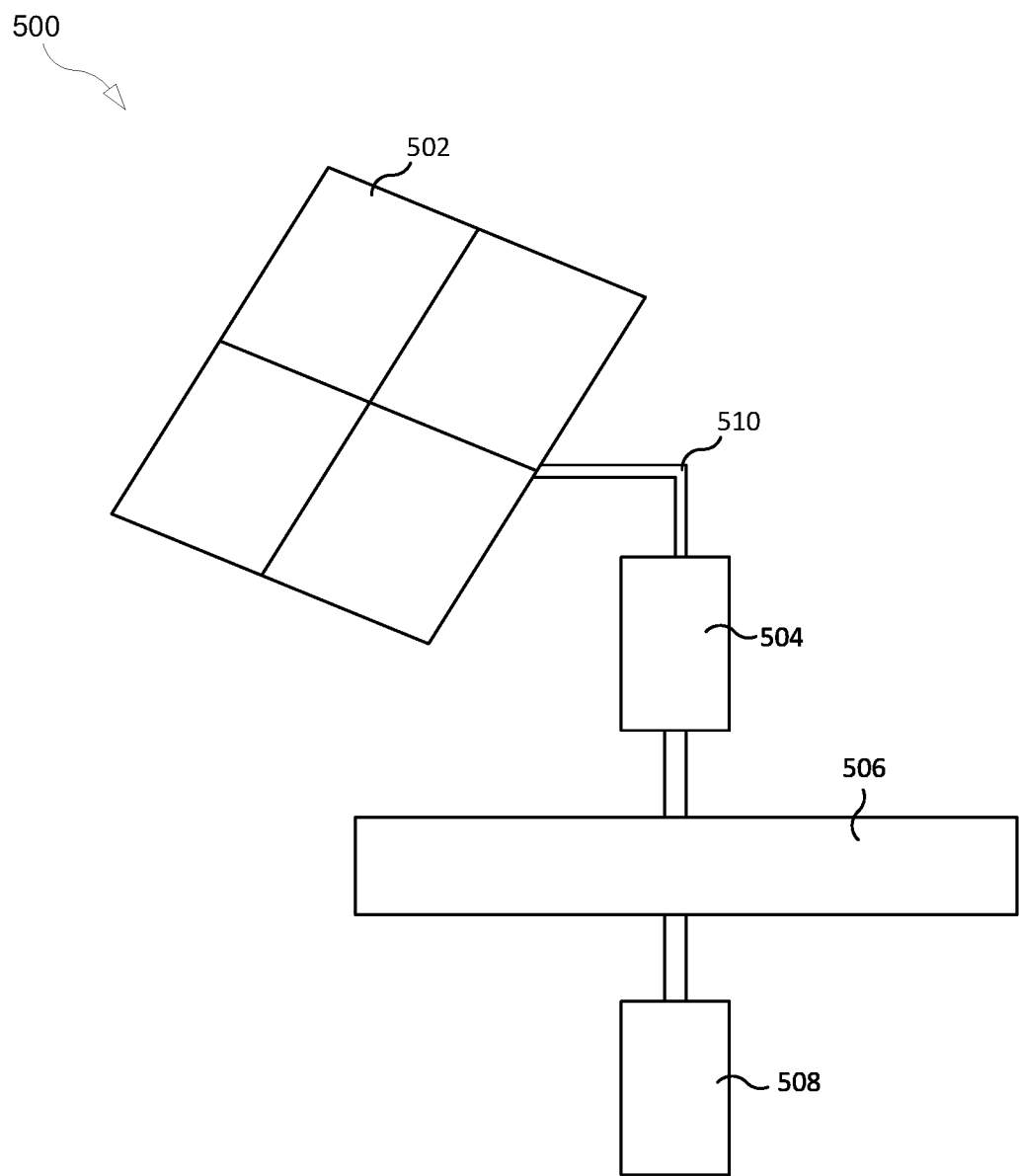
FIG. 5 illustrates a system according to embodiments.

FIG. 5 illustrates a system 500 according to some embodiments. In the system 500, the output power from solar cells 502 can be smoothed, stored, and recovered using a pressure receiver 506, an expander 508, and a compressor 504. The solar cells 502 are connected to the compressor 504 via a connector 510 to power the compressor 504. While a single panel of solar cells 502 is shown, more panels can be used in this embodiment.

For a solar cell such as a photovoltaic voltaic, there is a need to power the compressor using an electric motor. But unlike conventional wind turbines that generate electric power, there is no possibility of electrical interaction between the individual electrical generators, and individual solar photovoltaic cells can be simply ganged up allowing the output of many solar cells to be combined through a single large master compressor feeding into an array of compressed gas receivers feeding a single master expander. An example is provided in FIG. 6.

Figure 6:
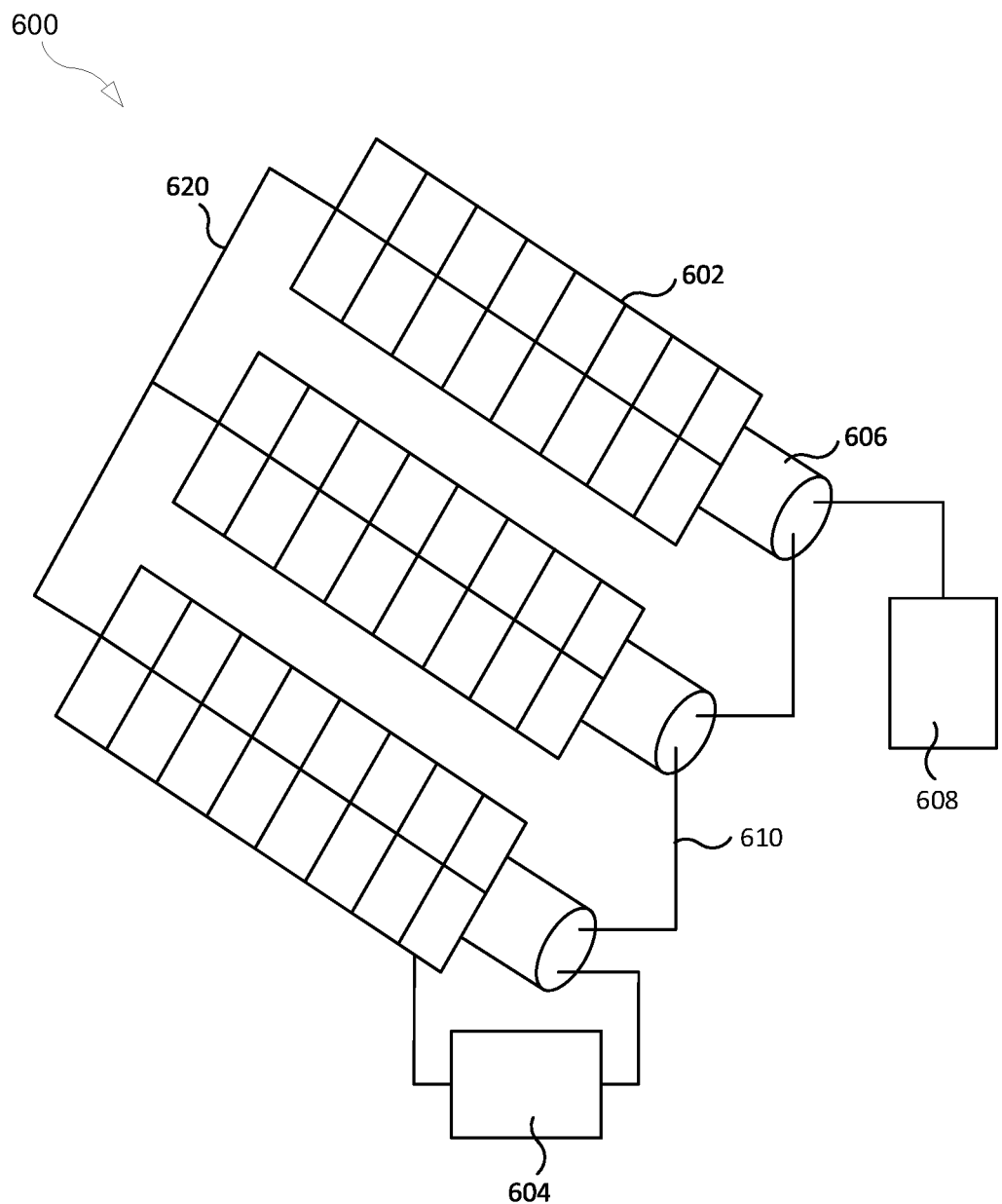
FIG. 6 illustrates a system according to embodiments.

FIG. 6 illustrates a system 600 where the output power from a solar park 602 can be used to drive a large master compressor 604 smoothing the output and storing the energy across a ganged array of pressure receivers 606 (e.g., each solar unit/panel/array in park 610 may have its own pressure store) and recovering the energy on demand via a master expander 608 or engine. In this example, 620 is power line connecting the power outputs of the units of the ganged array, and 610 is a pressurized gas line connecting the pressurized receivers 606 of the respective units. According to embodiments, one can use existing gas piping since it is the right size, cheap, and can handle the pressure.

According to some embodiments, a natural gas overland pipeline can be used as the compressed gas receivers 606 that can be used in the solar array (or similarly in wind embodiments), as this makes the compressed air storage very scalable.

Solar photovoltaic arrays also have the added advantage that only 20% of the available solar energy is captured and converted into electricity. The remaining 80% could be absorbed into a film of partially transparent fluid running over the photovoltaic cells surface absorbing some of the otherwise lost solar energy. This also has the advantage of cooling the surface of the photovoltaic maintaining its efficiency. This heat can then be added into the compressed gas before entering the expander, greatly improving the overall efficiency of the energy capture, energy smoothing, storage, and recovery process. For instance, heat may be added via a heat exchanger as described with respect to FIGS. 1 and 3, or directly to one or more pipes of systems 500 or 600.

Similar implementation can be made with the pressure receiver used on an air mill where the south-facing side (for instance) of the receiver is painted black to absorb sunlight and the backside of the receiver shrouded in an insulator.

According to embodiments, any intermittent low value renewable energy can be treated in the manner described above, and if a source of high-grade heat is available then the efficiency of the energy capture, storage and recovery process can be quite high. Another example of a renewable source that may be utilized using similar technique as solar and wind is tidal. Thus, while solar and wind are used as examples, according to embodiments, tidal energy sources may be used.

Figure 7A:
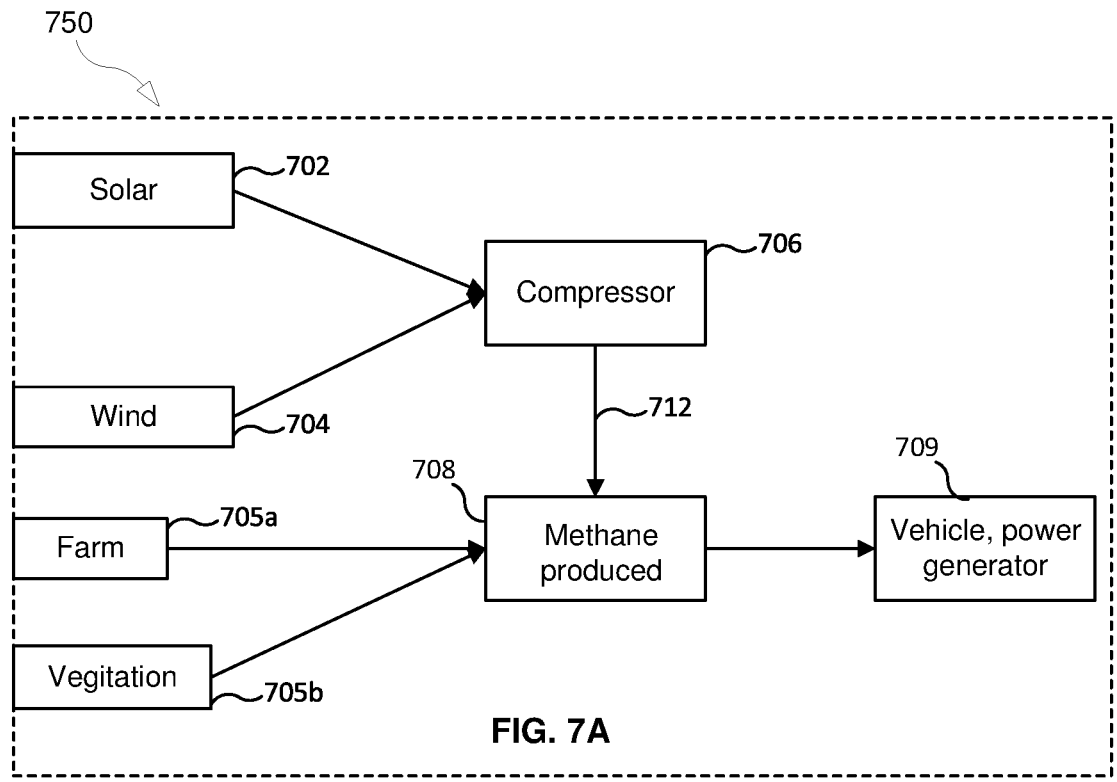
FIGS. 7A and 7B illustrate methods according to embodiments.

Referring now to FIG. 7A, a system 750 is provided where a portion of the energy captured at renewable energy sites 702 and 704 is used to create a liquefied or compressed gas 712 (e.g., air, nitrogen, etc.) using one or more compressors 706. This compressed material 712 can be used for cooling at local or remote biomethane generation/storage sites 708. Such sites may be located where there is an abundance of waste biomass such as the solar park or windfarm itself or alternatively golf courses, sports fields, parks and roadside verges etc. According to embodiments, the compressed gas or liquid cryogen derived from renewable energy is used to process the raw biogas created from an anaerobic digestion process. This can be accomplished using either a mobile or fixed biogas processing plant. Where the processing is performed in a mobile plant (e.g., with equipment mounted on a truck), processing can occur between the intermittent energy source locations and other geographic locations, for instance, gas-based fuels can be used or sold, such as a site 709 with a vehicle or other power generator. In some embodiments, the raw biogas is from a farm (e.g., dairy farm) 705a or source of vegetative green waste 705b. Detailed processes for generating biomethane is described below with respect to FIGS. 2, 2A, 2B, and 2C. According to embodiments, the compressed gas or cryogenic liquid used in biomethane processing may be generated as described in connection with one or more of FIGS. 1, 3, 4, 5, and 6.

Figure 2C:
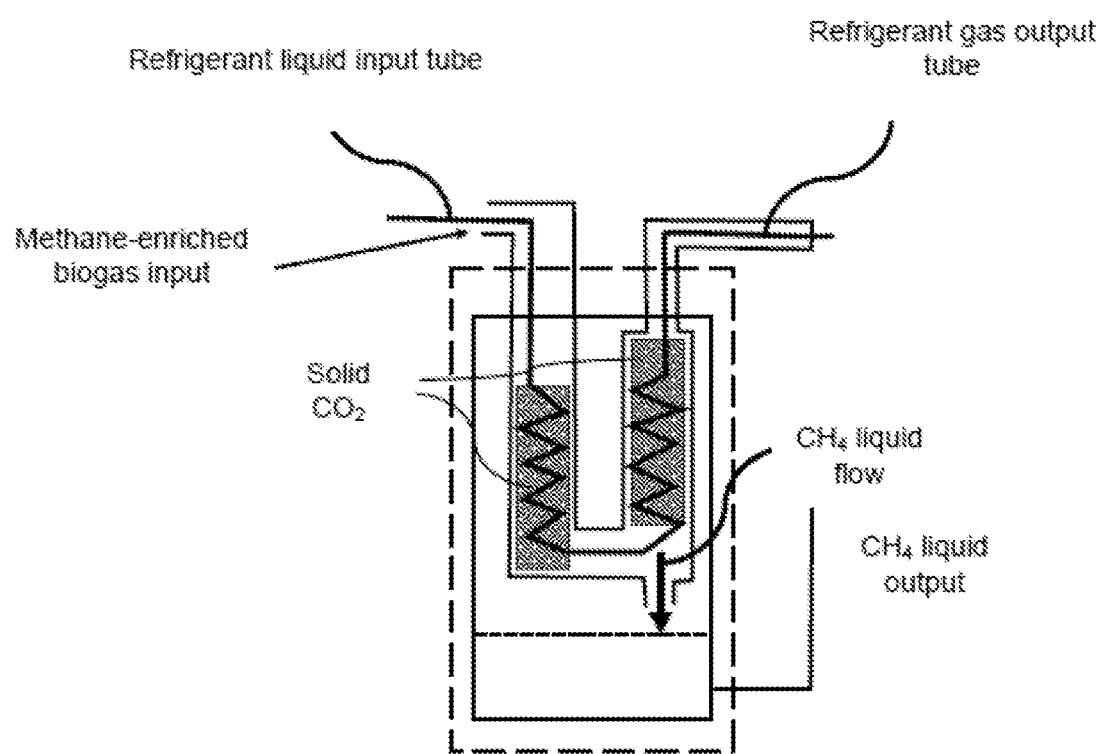
FIG. 2C illustrates a combination $CO_2$ removal and liquefaction unit according to embodiments.

FIG. 2 illustrates an exemplary biogas separation and methane liquefier 200, according to some embodiments. FIG. 2A illustrates an exemplary $CO_2$ removal unit (e.g., cold box) 206 according to some embodiments. FIG. 2B illustrates an exemplary liquefaction unit (e.g., Joule-Thompson unit) 212 according to some embodiments. FIG. 2C illustrates an exemplary $CO_2$ removal and liquefaction unit according to some embodiments. The biogas separation and methane liquefier 200 is now described with reference to FIGS. 2, 2A, 2B, and 2C.

The biogas mixture (e.g. a methane enriched biogas, such as from one or more of the methane-enriched spaces of an anaerobic digester 1100) is optionally first compressed by a compressor (not shown) to a processing pressure (e.g. between 100 bar and 300 bar), filtered by one or more filters (not shown), and then fed to the gas inlet 202. As a general matter, the lower the processing pressure, the less energy is required for liquefaction, while the higher the processing pressure, the easier it is to separate the carbon dioxide and methane (e.g. because there is more separation in phase diagrams for allowing the carbon dioxide to become a liquid while the methane remains a gas). The processing pressure could be as low as 30 bar, and may be higher than 300 bar. Also, the size of components may generally be made smaller as the pressure increases, e.g. due to the volume of gas decreasing at higher pressure. In exemplary embodiments, the processing pressure is around 100 bar to 300 bar. The biogas entering at inlet 202 will be, in some embodiments, approximately 85% methane and approximately 15% carbon dioxide, from about 100 bar to 300 bar, and about 20° C. (or whatever temperature the biogas is at after exiting the anaerobic digester 100). In embodiments, the biogas may be pre-processed, such that one or more of compression and/or filtering are not required. In some embodiments, biogas is compressed and/or stored as described in FIGS. 1, 3, 4, 5, and 6.

From gas inlet 202, the biogas mixture passes through piping 221 to a heat exchanger 204 and then through piping 223 to a $CO_2$ removal unit (e.g., cold box) 206. Heat exchanger 204 may, in some embodiments, be cooled by $CO_2$ (e.g. at around −60° C.) before the biogas flows through piping 223 to enter the cold box 206. The $CO_2$ (e.g., in liquid form) that cools the heat exchanger 204 may be supplied by the removal unit 206 by piping 233 (in which case it will be at approximately the temperature of the cold box), prior to the liquid $CO_2$ exiting the system by piping 225 to the $CO_2$ outlet 210. Such $CO_2$ can also be provided to the liquefaction unit 212 in some instances, as a source of cold.

Inside the removal unit 206, there may be a second heat exchanger 214 (see, e.g., FIG. 2A), which may be cooled by a high power cascade refrigerator 208 driving a circuit of cooled refrigerant (or other cooling method, e.g. a cryocooler or liquid cryogen). The cooling by the cascade refrigerator may cool the cold box 206 to a temperature appropriate for causing the carbon dioxide to liquefy (or drop out as a solid) while maintaining the methane as a gas. The precise temperature will depend on the processing pressure. For instance, at pressures of about 100 bar-300 bar and temperatures of about −40° C. to −60° C., methane is a gas and $CO_2$ condenses to form liquid. In embodiments, the temperature that the cold box 206 is cooled to may be approximately from about −40° C. to −60° C., and in embodiments may be approximately −60° C. Refrigerator 208 is coupled to the cold box 206 by piping 227 and 229, which carries refrigerant into and out of the cold box 206, respectively.

According to embodiments, the methane is cooled but remains a gas as it passes over the heat exchanger 214, whereas the $CO_2$ condenses to a liquid (or, in some embodiments, a solid) and falls to the bottom 206a of the cold box 206. The extracted $CO_2$ may then exit cold box 206 by piping 233. In some embodiments, solid $CO_2$ may be retained in solid form until a batch of biomethane has been refined or the box is full, when the system may be shut down, the equipment warmed, and the $CO_2$ may be removed in either gaseous or liquid form. As noted above, it may in some embodiments first pass through the heat exchanger 204 in order to take advantage of the fact that liquid $CO_2$ is cooled by the cold box (e.g., to approximately −60° C.). Doing this can save considerable energy requirements, because the cascade refrigerator 208 will not need to cool the gas entering the cold box as much in such a case. When the $CO_2$ leaves the heat exchanger 204 by piping 225 and reaches the outlet 210, it may have an approximate temperature of around 20° C. (or approximately whatever temperature the biogas entering the heat exchanger 204 has), and be at about 100 bar-300 bar. The cold box 206 is insulated (insulation shown by dashed lines around cold box 206) to conserve cold and reduce the cooling power requirement.

The now cold, but still pressurized methane, passes by piping 231 to the liquefaction unit (e.g., Joule-Thompson unit) 212. The liquefaction unit may also serve as a storage unit. However, the system 200 may include additional methane storage units (not illustrated), which can be removable as needed. When passing through piping 231, the gas is approximately 99% pure methane, with around 1% carbon dioxide, is still at around 100 bar-300 bar, and is cooled due to the cold box 206 (e.g. to approximately −60° C.). In the examples of FIG. 2B, the Joule-Thompson unit 212 is where the liquefaction stage of the process for the methane gas takes place. The unit 212 is insulated (shown in dashed lines), which can help conserve cold and reduce the cooling power requirement. The pressurized methane passes through a heat exchanger 216 (see FIG. 2B) within unit 212. The heat exchanger 216 may be cooled by the outgoing low pressure methane (that passes through piping 235), causing the pressurized methane to cool further before passing through an orifice 218 (such as a Joule-Thompson orifice), where the methane finally cools to a low enough temperature to liquefy. The methane entering through piping 231 is at about the pressure of the methane in the cold box 206, e.g. approximately 100 bar to 300 bar in some embodiments. The pressure as the gas passes through the orifice 218 reduces to a low pressure, e.g. about 1 bar. The methane is cooled by the heat exchanger 216 to a temperature at which the methane will liquefy. This will depend on the pressure after the gas passes through the orifice 218, but in some embodiments, the temperature may be approximately −161° C. or lower. If the temperature is too cold, the methane may solidify, which would block the output pipework. Therefore the temperature is preferably cold enough to cause the methane to become liquid, but not too cold to solidify the methane. The liquefied methane falls to the bottom 212a of the unit 212, where it is at an approximate temperature in some embodiments of about −161° C. Because the methane is already cold and is at high pressure when it enters unit 212, the liquefaction fraction will be high, typically 70%-80%, resulting in a very efficient process. That is, most of the methane will liquefy and exit by piping 237 as liquid methane, for instance at retrieval or when moved to on-board storage. Some of the methane, however, will remain in gaseous form, and will exit via piping 235 as gas, at a lower pressure of about 1 bar. At this point, both the liquid and gaseous methane may be very pure, in embodiments more than 99% pure methane.

The Joule-Thompson unit 212 just described is an exemplary mechanism for liquefying methane gas. In some embodiments, a cryocooler, Brayton cycle device, or other device for liquefying methane may be used. Further, while the description above noted that the cold box is configured to liquefy $CO_2$ gas but not methane gas, in embodiments the cold box may be configured to liquefy and/or solidify $CO_2$ gas but not methane gas.

For high levels of methane refinement where the $CO_2$ makes up a small fraction of the total volume (such as approximately 1-10%), the $CO_2$ can conveniently be removed as a solid without requiring equipment (such as a cold box or heat exchanger) that is bulky or too large for being used as part of a mobile biogas processing plant. The methane can then be simultaneously removed as a liquid at low pressure. By sizing the heat exchanger appropriately, this can occur within a common liquefaction and low-pressure $CO_2$ removal unit (e.g., cold box enclosure), such as shown in FIG. 2C. In certain scenarios where there is limited power availability at the site to drive a compressor, this can provide a more energy-efficient solution and can be further enhanced through the use of a low-cost sacrificial cold source such as an inert liquid cryogen, for example liquid nitrogen. Where appropriate this can conveniently be brought to the site as a liquid in sufficient quantity to carry out the gas processing required for the period in question. In some embodiments, gas inlet 202 is adapted for receiving $CO_2$ enriched biogas. In embodiments, the methane-enriched and $CO_2$ enriched inlets comprise a single inlet 202.

As well as the source of cold being a sacrificial cryogenic liquid, where convenient it could also be a mechanical cooler used to liquefy air at the site or alternatively a close cycle refrigeration circuit. Whichever source is used, it must provide sufficient cooling for both phase changes in the $CO_2$ gas to solid and the methane gas to liquid in embodiments. Where the refrigerant is a sacrificial cryogenic liquid such as liquid nitrogen or liquid argon that has a boiling point lower than the freezing point of methane care must be taken to ensure that the methane liquefaction process temperature is maintained above the freezing point of methane at the process operating pressure otherwise solid methane will form causing blockages in the heat exchanger path. At atmospheric pressure methane freezes at approximately −182° C. which is above both the boiling point of liquid nitrogen and liquid argon. A safe liquefaction operation temperature can conveniently be achieved by holding the sacrificial cryogenic liquid at a higher than atmospheric pressure via a pressure release valve. This also has the advantage of providing a failsafe system ensuring that its boiling point is maintained above that of the freezing point of methane without the need for active control. For liquid nitrogen for example a pressure of 5 bar would maintain a boiling point of approximately 172° C. ensuring that the methane gas stream never freezes.

According to embodiments, solid $CO_2$ may be used to improve the liquefaction process in stage 212. For instance, a refrigerant liquid can be introduced to cause solid-form $CO_2$ buildup in stage 212, which can in turn provide a source of cold for liquefaction of the methane. As such, a liquefaction stage 212 may comprise a refrigerant liquid input and output, as shown in FIG. 2C. In some embodiments, liquid refrigerant may be provided in an outer region of the stage 212, which is separate from the liquefaction chamber, as illustrated with the dashed-line box of FIG. 2C. In embodiments, the dashed-line box may instead represent an insulation layer. In some embodiments, and as illustrated in FIG. 2C, a sacrificial refrigerant liquid (e.g., liquid nitrogen or liquid air) can be introduced by a flexible tube or pipe. Similarly, it may be extracted (e.g., in gas form) via an outlet tube or pipe. In some embodiments, and as shown in FIG. 2C, the refrigerant tube or pipe may be located within the input tube or pipe of the biogas (e.g., methane-enriched biogas). That is, the liquefaction stage may use a tube-in-tube (or pipe-in-pipe, or tube-in-pipe) arrangement with cold liquid flowing within the biogas flow path (or vice-versa). This arrangement may beneficially cause a build-up of solid $CO_2$ in the path of the biogas, which can have benefits for both purification and cooling of the biogas. That is, biogas may flow through solid or liquid-form $CO_2$ extracted from biogas or generated from a sacrificial source. According to embodiments, the refrigerant liquid may be from an extraction stage of the unit, or retrieved from on-board storage of a mobile unit (e.g., on a truck).

According to embodiments, the whole system is compact enough to fit onto the back of a small truck and be powered from a small methane powered engine. In certain aspects, the biogas can be processed while the system is in transit. For instance, biogas may be processed while a vehicle housing system 200 is travelling between one or more digesters (e.g., digesters at a farm 705a or other location 705b), or between a digester and a central hub or storage location, as illustrated in connection with FIG. 7A.

The biogas processing system is thereby greatly simplified, has very little power requirement and is able to much more rapidly process the biogas into its more valuable constituents of liquid biomethane and liquid or solid carbon dioxide. The same is true for sites naturally producing fugitive methane such as dairy farms where according to prior art a sealed manure lagoon has been installed. Liquid nitrogen may be used instead of liquid air as it is completely inert and renders the biogas process extremely safe. However, other materials may be used according to embodiments.

The liquid nitrogen generated from renewable energy is therefore often considered more valuable than the poor quality intermittent renewable electricity generated in current systems. It also means that the biogas processing operator can position their liquid nitrogen generation plant at the renewable energy site with no requirement for grid access. The methane generated and/or stored in the site 708 (or 705a, 705b) may be sold in a market or used as a fuel for a tractor or a power generator 709.

According to embodiments, the cooling described in connection with the systems, devices, and processes of FIGS. 2, 2A, 2B, and 2C may be provided by compressed gas or cryogens derived as described with respect to FIGS. 1, 3, 4, 5, and 6. In certain aspects, and according to embodiments, the biogas separation, CO2 removal, and liquefaction may be powered by intermittent renewable energy sources as described herein.

Figure 7B:
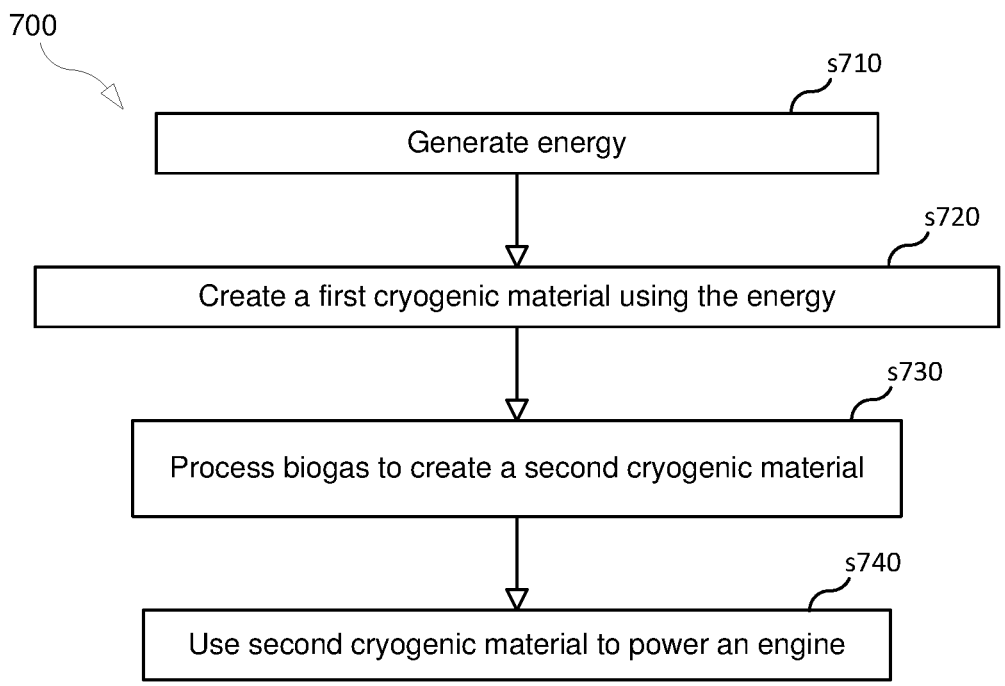

Referring now to FIG. 7B, a process 700 is provided according to some embodiments. The process 700 comprises: step 710 (generate energy (e.g., using wind, solar, or tidal)); step 720 (create a first cryogenic material (e.g., liquid nitrogen) using the energy); step 730 (process biogas to create a second cryogenic material (e.g. liquid methane or CO2); and optionally step 740 (use second cryogenic material to power an engine). As discussed above, in some embodiments, the first cryogenic material may be used for cooling during the process of creating the second cryogenic material.

There may be a scenario where there is an abundance of zero carbon fuel such as liquid biomethane aggregated from remote sites where there is an abundance of otherwise waste biomass such as grass cuttings. In such scenario, liquid biomethane can be used to replace vehicle fuel but could also be used to generate electrical power at existing renewable energy sites such a solar parks or wind farms when there is little renewable resources available such as night time for a solar park or during a low wind period at a wind farm. A combustion engine (e.g., an internal or external combustion engine), such as a Sterling engine, can be remotely switched on when required and can provide a convenient supply of power using the grid access available. This also has the advantage that such access points are usually substantial in order to handle the peak output of the renewable energy resource at peak wind or solar conditions. However, in general there is no requirement at such sites for the waste heat from the combustion engine which can be very significant.

As an example with existing systems, the methane engine such as the Fiat Power Train Cursor 13 used in trucks is approximately 40% efficient and can provide a sustained output of 340 kW mechanical output power equating to over 514 kW of waste heat output. Much of this heat is through the exhaust and therefore at very high temperature as it is emitted as exhaust gases typically above 600 C. This can be considered very high-grade heat and if used to gasify and preheat the high pressure cryogenic storage gas before entering the expander as a gas, a high proportion, in excess of 70%, will be recovered as additional mechanical energy output from the expander. In some respects, this is a similar mechanism as a gas turbine. The mechanical output from the combination of the expander and the combustion engine is now 700 kW instead of the original 340 kW from the engine alone.

Figure 8A:
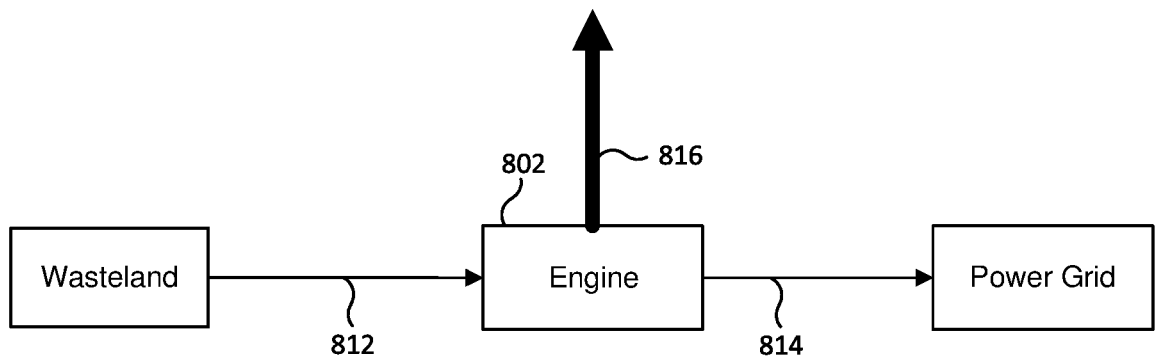
FIGS. 8A, 8B, and 8C illustrate methods according to embodiments.
Figure 8B:
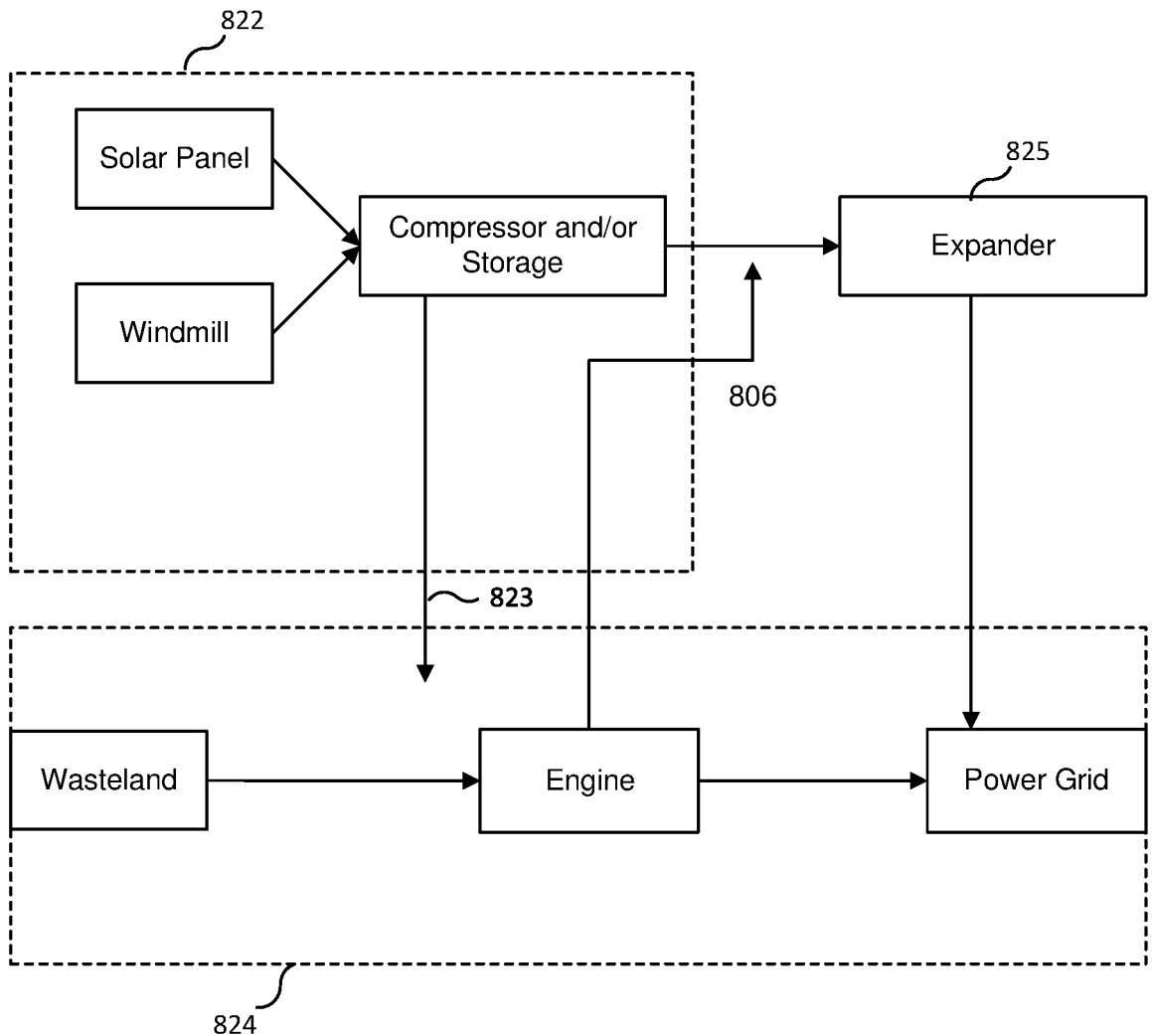
Figure 8C:
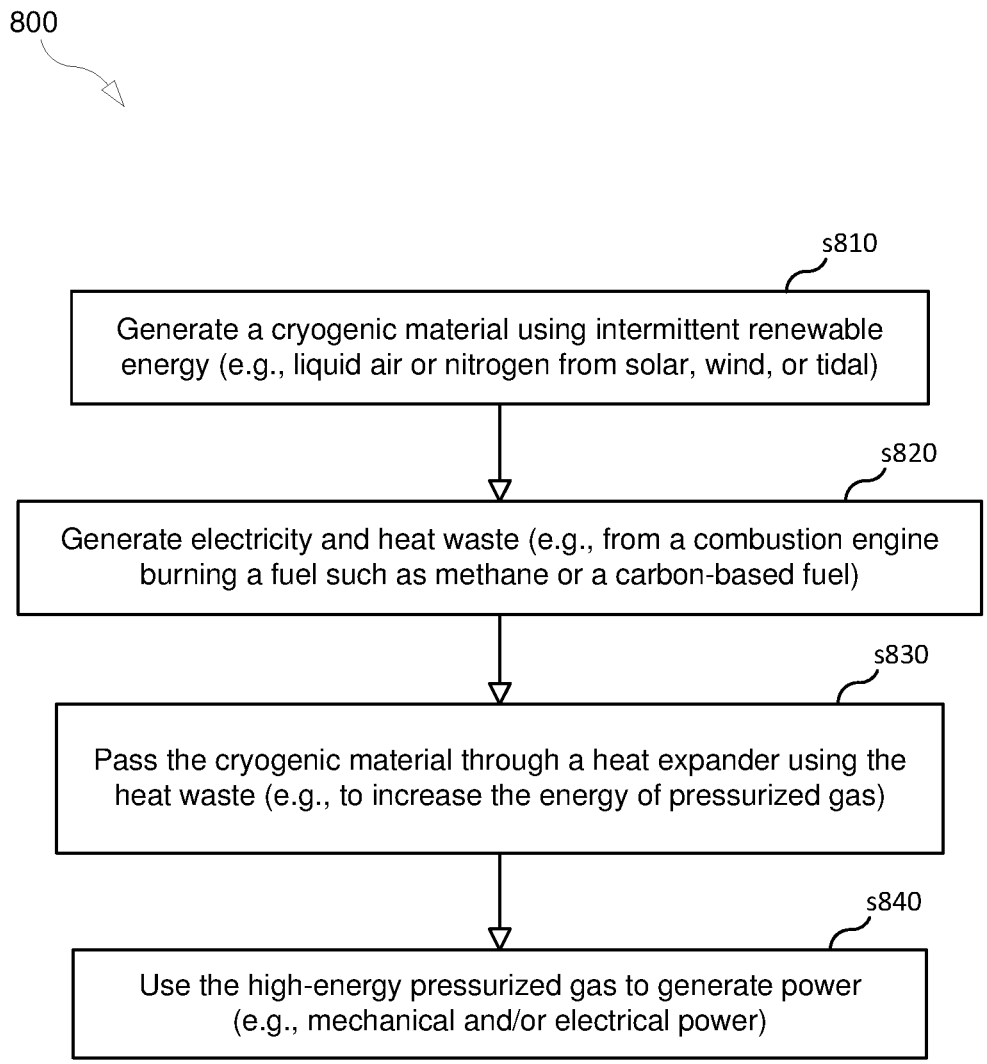

Referring now to FIGS. 8A-8C, liquid biomethane can be used to power a combustion engine to generate electricity on demand at convenient grid locations such as renewable energy sites, thereby increasing its value compared to vehicle fuel.

As shown in FIG. 8A, when the biomethane 812 (e.g., from a waste site such as 705a, 705b) is used by an engine 802 to create electricity 814, heat waste 816 may be generated. In some embodiments, this heat waste 816 may be re-captured and used to add energy to a gas for expansion, thereby improving energy recovery. Heat waste 816 can be delivered to local properties, in some embodiments. The electricity 814 could be delivered to the power grid. According to embodiments, the heat may be used as a source of heat (e.g., before an expander) in any of the system described in FIGS. 1, 3, 4, 5, and 6.

Referring now to FIG. 8B, a flow diagram is provided that shows the interaction between two systems 822 and 824. A first system 822 generates liquid nitrogen or other cryogens, which can be delivered 823 to system 824. For instance, it may be used in system 824 for biogas processing. In certain aspects, biogas processing may include one or more systems and devices as described with respect to FIGS. 2, 2A, 2B, and 2C. System 822 and expander 825 may correspond, in embodiments, to one or more of the system of FIGS. 1, 3, 4, 5, and 6, or components of such systems. System 824 generates electricity, but also waste heat 806. The waste heat can be used during expansion of the liquid nitrogen (or other materials) generated in system 822 and expanded, to create additional electricity. The system 824 may correspond to the system described in FIG. 8A in some embodiments.

According to embodiments, a biogas used in any of the systems and processes of FIGS. 8A and 8B can be obtained from an anaerobic digester, such as system 1100.

Referring now to FIG. 8C, a process 800 is provided according to some embodiments. The process 800 may begin, for example, with step s810 where a cryogenic material is generated using intermittent renewable energy (e.g., generating liquid air or nitrogen from solar, wind, or tidal). While intermittent sources are used in this example, other non-intermittent applications may be used. In step s820, electricity and heat waste (e.g. from a combustion engine burning a fuel, such as methane or carbon-based fuel) are generated. In step s830, the cryogenic material is passed through a heat expander, which uses the heat waste (e.g., to increase the energy of the pressurized gas) from the generation of electricity in step s820. In step s840, the high-energy pressurized gas is used to generate power (e.g., mechanical and/or electrical power).

Figure 9:
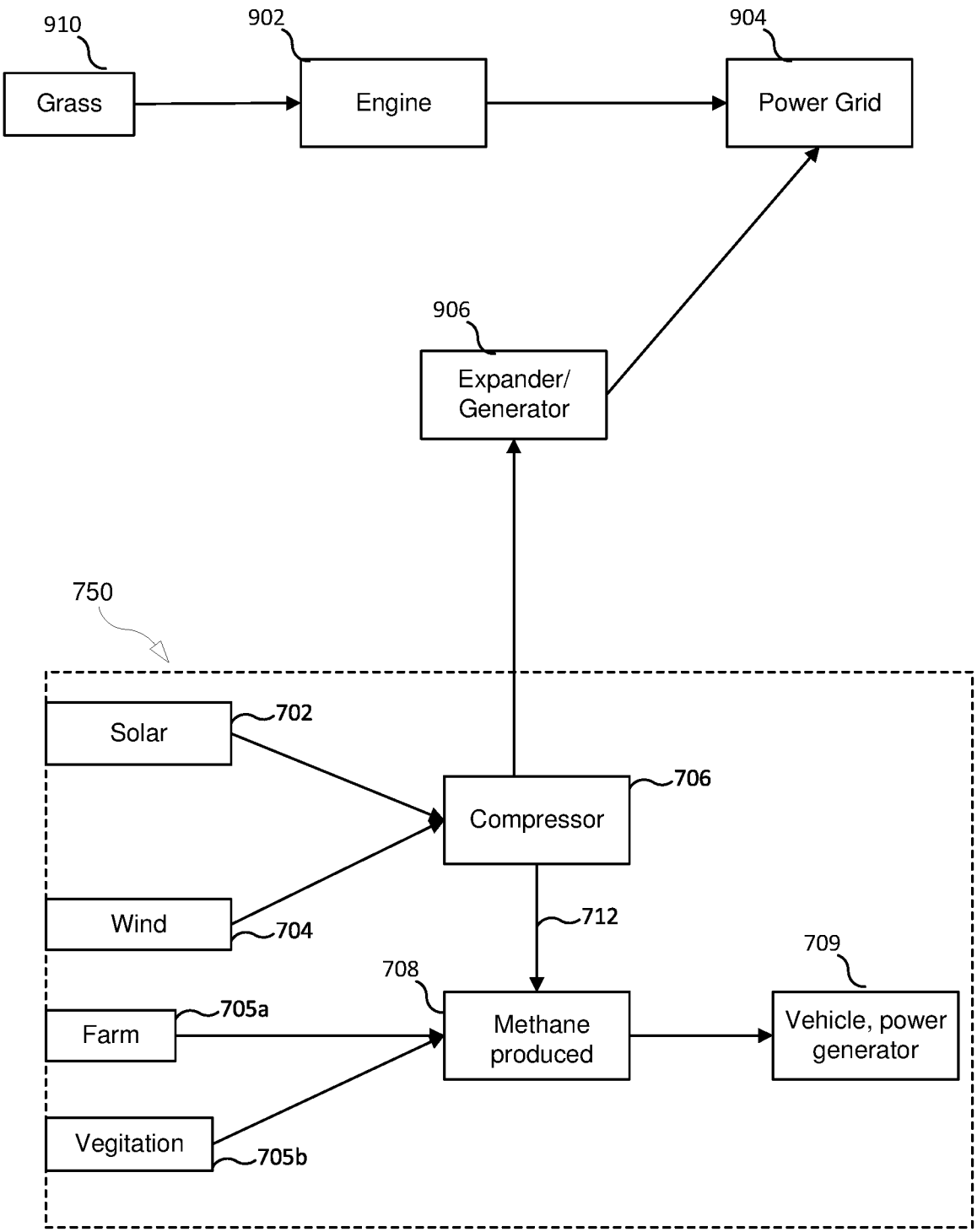
FIG. 9 illustrates a process according to embodiments.

Referring now to FIG. 9, the interrelation between various processes is depicted according to some embodiments. More specifically, FIG. 9 shows an overall system 900 for producing energy according to some embodiments. As shown in FIG. 9, the system 900 may include the system 750 shown in FIG. 7A.

In the system 900, an engine 902 may generate electricity using biomethane and provide the generated electricity to a power grid 904. The biomethane may be generated from a biogas source, such as grass or other vegetative sources 910 and/or anaerobic digestion (e.g., system 1100). In some embodiments, the source 910 may be co-located with the renewable energy site. In addition to the electricity generated from the biomethane, additional electricity may be generated from an expander/generator 906. As discussed with respect to FIG. 7A, the compressor 706 may generate compressed gas or cryogens (e.g., liquid nitrogen) using the renewable energy, which may require a liquefaction stage (not shown). The generated compressed gas, or boil-off gas from the liquid cryogen, may be provided to the expander generator 906. The expander generator 906 may be configured to use the material to produce the additional electricity. Also, waste heat from the compressor 706 may be used by the expander/generator 906. For instance, to heat gas or increase boil-off from a cryogen reservoir.

Figure 10:
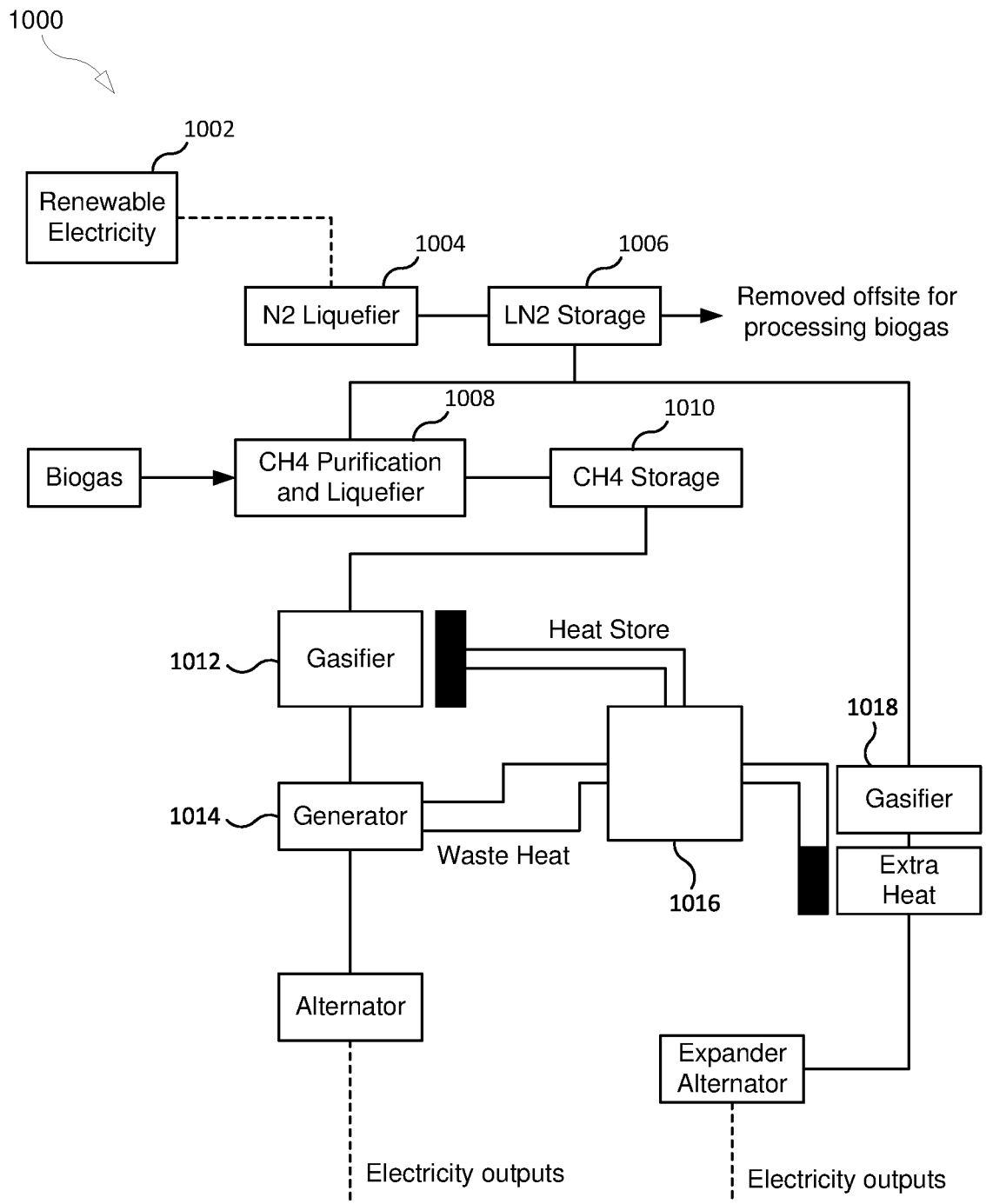
FIG. 10 is a flow diagram illustrating a system and process according to embodiments.

Referring now to FIG. 10, an energy capture and output system 1000 and associated process flow are depicted according to some embodiments. In this example, energy is generated from renewables 1002 (e.g., wind, solar, tidal), which is used to run a nitrogen liquefier 1004. The liquefier 1004 is configured to liquefy nitrogen gas into liquid nitrogen. This liquid nitrogen is stored at cryogenic temperatures in a storage 1006. While liquid nitrogen is used as an example, other cryogens (e.g., liquid air) may be used in some embodiments. In certain aspects, the cryogens may be generated and stored as described in connection with FIGS. 1, 3, 4, 5, and 6.

According to embodiments, a methane purification and liquefier 1008 may be provided. While methane is used as an example, other gases may be processed. The purification and liquefier 1008 may use the liquid nitrogen (or other cryogen) obtained from the storage 1006 to purify or otherwise process biogas (e.g., generated from biomass from the same or different sites) yielding substantially pure methane at cryogenic temperatures. The purified methane is stored at cryogenic temperatures in a storage 1010. This may be performed, in embodiments, using one or more of the devices and processes described in connection with FIGS. 2, 2A, 2B, 2C, and 4.

In some embodiments, when the price or demand for electricity is high the methane stored in the storage 1010 may be converted back into a gas at a gasifier 1012. In some embodiments, the gasifier may be optional and boil-off gas from storage 1010 may be used directly. A heater may be included in storage 1010 for on-demand gas from a reservoir of cryogen. The gas from the gasifier 1012 may be provided to a generator 1014. The waste heat from the generator 1014 is optionally stored in a heat store 1016. Excess liquid nitrogen from the storage 1006 can either be taken off site for purifying biogas in other locations or run through a turbine (a gasifier 1018) to generate more electricity. Heat from the heat store 1016 can be used to improve the efficiency of this secondary generation process (e.g., with a heat exchanger).

According to some embodiments, the use of the heat store 1016 is optional. In certain aspects, the incorporation of a heat store provides the means to enhance the expander energy recovery process without having the combustion engine running. However, in some embodiments, the waste heat from the generator 1014 may be used in real time to directly enhance the expander energy recovery process on a continuous basis. In some embodiments, the heat may be used to increase boil-off from storage 1010.

An anaerobic digester is now described.

FIG. 11 illustrates an exemplary anaerobic digester 1100 according to some embodiments. FIG. 11A illustrates an exemplary biogas storage container 1104 according to some embodiments. Anaerobic digester 1100 will now be described with reference to FIGS. 11 and 11A. Anaerobic digester 1100 may take the form of a sealed slurry lagoon. As shown, anaerobic digester 1100 includes a biomass storage container 1102 for storing biomass (such as slurry) and a biogas storage container 1104 for storing biogas resulting from the anaerobic digestion of biomass. The biogas storage container 1104 is separated by a semi-permeable membrane 1110 into a first space 1108 and a second space 1106. The membrane may be, for instance, selectively permeable to methane vs. $CO_2$, allowing one to pass and the other not to pass (or pass more slowly). As shown, the second space 1106 is $CO_2$ (carbon dioxide) enriched, while the first space 1108 is $CH_4$ (methane) enriched.

Anaerobic digester 1100 may also include a cover 1112, which may be positioned over the biogas storage container 1104 in order to protect the biogas storage container 1104 from the elements. This could include, for instance, protection from rain and/or wind. Cover 1112 may be transparent, and may also provide for passive solar heating of the biogas storage container 1104. It should be strong, chemically inert and immune to damage from ultraviolet light. An example may include Ethylene Tera Fluoro Ethylene (ETFE), though other materials may be suitable.

The second space 1106 of the biogas storage container 1104 and the biomass storage container 1102 may be coextensive. That is, in some embodiments, there may be no physical separation between the biomass storage container 1102 and the second space 1106 of the biogas storage container 1104.

Anaerobic digester 1100 may also include an input 1120 for receiving biomass (such as slurry) into the biomass storage container 1102. Additionally, anaerobic digester 1100 may include output valves 1122 and 1124, coupled respectively to the second space 1106 and first space 1108 of the biogas storage container 1104. That is, the biogas located within the biogas storage container 1104 may be removed from the biogas storage container 1104 by pipes or hoses connecting to one or more of output valves 1122 and 1124. Such pipes and hoses may connect to a mobile processing plant, and provide enriched biogas to such a processing plant.

The anaerobic digester 1100 may be installed underground, or partially underground. As shown, ground level 1114 is indicated in FIG. 11 by a dashed line. In the embodiment shown, the biomass storage container 1102 is entirely underground, the second space 1106 of the biogas storage container 1104 is partially underground and partially above ground, and the first space 1108 of the biogas storage container 1104 is above ground. Other configurations are possible. Anaerobic digester 1100 may be installed by digging a pit in the ground. The pit may include inclined banks 1102a. In some embodiments, there may be additional layers, such as an insulation layer provided between the ground and the biomass storage container 1102. For instance, an insulation layer could prevent the slurry or other biomass from seeping into the ground, or prevent the biogas from escaping the anaerobic digester 1100.

The anaerobic digester 1100 may be advantageously used with existing anaerobic digesting systems. The digester 1100 also provides additional benefits to small- to mid-sized farms in that they can economically employ anaerobic digestion where before it was not feasible. Because such farms may be in remote and diverse geographic locations, it is important that in some embodiments anaerobic digester 1100 is a simple design that can be readily implemented at such sites, with readily available equipment and processes. Rather than using an enclosure above ground (as is standard industrial practice), the digester 1100 may be made up of an excavated hole with banks made from the removed earth. This can negate the need for removal of soil from the site and can also negate the need for concrete.

Furthermore, and according to some embodiments, by tapering the walls at an angle, the space above the digester 1100 is increased so that it can hold sufficient quantity of biogas to maintain the needs of the periodic biogas processing and collection service in accordance with the space required for biogas generation from the slurry from a defined number of cows. That is, a mobile biogas processing plant may service a remote farm employing anaerobic digester 1100, and may make periodic visits, or visits at aperiodic intervals. Accordingly, the digester 1100 should have enough space for storing biogas that is expected to be generated before a next arrival time of the mobile biogas processing plant. Tapering the walls at an angle is one way to maximize the available space.

Anaerobic digester 1100 may additionally include one or more sensors. For instance, digester 1100 may include one or more sensors for measuring an amount of biomass present in the digester 1100, an amount of biogas present in the digester 1100, an amount of biogas present in each of the spaces (e.g. spaces 1106, 1108, 1108a) of the biogas storage container 1104, and/or a concentration of biogas present in the digester 1100 or in each of the spaces of the biogas storage container 1104. Such sensors may also include sensors to measure pressure and other process variables relevant to managing the biogas, such as detection of impurities. According to embodiments, the measurements are made with sensors using one or more sound waves. In certain aspects, the measurements are based on the measured speed of one or more sound waves. For instance, anaerobic digester 1100 may include a first transducer coupled to one or more of the digester's gas-containing regions (e.g., 1106, 1108, 1108a and/or feed pipes and hoses associated with the digester), where the transducer is configured to generate a first sound wave passing in a first direction through the gas. There may also be a second transducer coupled to the system to receive the first sound wave passing in the first direction through the gas or fluid flowing along the feed pipe. There may also be timing-circuitry in electrical communication with the first and second transducers and configured to measure a velocity of the first sound wave passing in the first direction from the first transducer to the second transducer. This can indicate one or more of amount of biogas, quality of biogas, etc.

Anaerobic digester 1100 may also include circuitry and other equipment in order to be able to communicate (e.g. wirelessly communicate) such sensor readings to remote sites, including a logistics coordination center. Anaerobic digester 1100 may also be able to receive commands and/or configuration settings from a remote site, including the logistics coordination center, that cause anaerobic digester 1100 to perform some action such as adjusting a setting or configuration of the digester 1100.

Biogas produced by anaerobically digesting the slurry can be pre-processed prior to liquefaction. In embodiments, such processing may include cleaning, such as by passing the biogas through a hydrogen sulfide removal system (such as activated charcoal filters). These filters may be located on the mobile biogas processing plant, implemented by one or more membranes of the anaerobic digester 1100, or may be fixed installations nearby the anaerobic digester 1100. The cleaning can further include drying to remove water vapor (such as by using an industrial dryer). The biogas can be passed from the anaerobic digester to the cleaning components due to the pressure generated in the anaerobic digester 1100. According to embodiments, the digester (1100) is maintained at positive pressure relative to the outside space as a result of the digestion of biomass in container 1102. A low-pressure return valve (located on one or both ends of the connection coupling the anaerobic digester 1100 and the filters for processing the biogas) ensures one-way passage through the system. This negates the need for a compressor in the processing/cleaning component, whereas in typical industrial-scale biogas cleaning and upgrading, the use of a compressor is required to force the biogas through the cleaning circuit and also through permeable gas membrane filters which are tightly packaged. A compressor like that used in such systems increases complexity and cost, and also requires additional power, which would lower the overall efficiency of the process. Accordingly, in embodiments anaerobic digester 1100 advantageously does not include a compressor.

The biogas storage container 1104, as described above, is separated into two spaces (1106 and 1108) by a semi-permeable membrane 1110 in FIG. 11. The semi-permeable membrane 1110 may comprise, for example, polytetrafluoroethylene (e.g., expanded PTFE (ePTFE), often referred to as Gore-Tex or Teflon) or silicone. This membrane material is selected to preferentially pass either methane or carbon-dioxide, for instance, where methane is lighter than carbon dioxide and is also a relatively large molecule compared with carbon dioxide. Other materials may be selected to exploit other variations between methane and carbon dioxide molecules.

As shown in FIG. 11, the second space 1108 is positioned higher than the second space 1106. A valve may be positioned to cause biogas from the slurry to move into one of the upper spaces (e.g., by pumping or natural pressurization), such as second space 1108. One or more hoses or pipes may also be used. This can be beneficial because gravity can aid in the diffusion or filtering process, helping to make the second space 1106 more carbon dioxide enriched and the first space 1108 more methane enriched. In some embodiments, there may be additional membranes creating more than two spaces in the biogas storage container 1104. For example, there may be a second membrane 1110a (see FIG. 11A), and the first and second membrane would then separate the container 1104 into three spaces, first space 1108, second space 1106, and an additional third space 1108a that would contain more pure methane than the first space 1108. In some embodiments, biogas from the space 1102 may be fed to a middle space (e.g., space 1108 in FIG. 11A). According to embodiments, a space in the digester 1100 can serve as a receiving space.

While two or three spaces are used as an example in some embodiments, there may be more. For instance, there may be more than two membranes (e.g. from three to ten membranes, and even more than that in some embodiments), and thus more than three spaces (e.g., from 4-11). Different membranes may have differing properties to control the relative flow of enriched gas. For instance, differing membranes may be used to filter different materials. For instance a first membrane may selectively filter carbon dioxide, a second membrane may selectively filter water, a third membrane may selectively filter hydrogen sulfide, and a fourth membrane may selective filter water. Thus, and according to embodiments, a digester with 1, 2, 3, or 4 membranes is provides. Similarly, and according to embodiments, a digester with 2, 3, 4, or 5 spaces is provided. According to some embodiments, one or more pipes, hoses, and valves may be used to direct (e.g., by pumping or natural pressurization) the unfiltered-gas to a selected space to start the filtration process.

By stacking multiple spaces on top of one another, and through the use of multiple semi-permeable membranes, the diffusion process may be improved. For instance, methane may slowly progress upwards through the (vertically stacked) spaces while $CO_2$ moves progressively down, e.g. due to the differences in density and molecule size, and therefore the purity of the methane may increase as a function of both height and time. In such embodiments, there may also be additional valves (such as valve 1124*a*) for removing the methane from the additional spaces, as it can be more efficient to process methane that is more pure. Also, it may be beneficial to have a relatively leaky membrane closer to the bottom and less leaky closer to the top to allow more of the heavier larger $CO_2$ molecules to drop down. The permeability of the various semi-permeable membranes may differ (e.g. they may have different pore sizes), and for example, could be optimized for gas production or methane purity. In some embodiments, a membrane used to selectively filter a material from methane may have a separation factor of between 3.0 and 40 depending on material (e.g., 3.42 for $CO_2$, 10.5 for hydrogen sulfide, and 37.9 for water). Similarly, there may be relative separation factors between the filtered materials (e.g., 3.6 between water and hydrogen sulfide and 11.7 between water and $CO_2$). Such selective permeability can be used advantageously in a stacked arrangement for a digester 1100. A gas may become more refined when passing through different spaces and membranes. A table of permeability values for silicone is provided in Membrane Gas Exchange, by J. Patrick Montoya and MedArray, Inc. (2010).

In some embodiments, a composite membrane may be used, in which two or more membranes are combined. This can be used, for example, to add additional filtering properties (e.g., where the second membrane also selectively filters) or for improved strength and control of the membrane. For instance, a filtering membrane may be layered onto a backing material to add rigidity or support. According to an embodiment, the physical strength required to be self-supporting over a large area may be improved with a composite membrane, where the strength and porosity of a particular material (e.g., a aramid or para-aramid material such as Kevlar or PTFE-based material such as Gore-tex) is used as a backing material to a highly-selective silicone membrane to control the stretching of the silicone pores, which might change the properties of the membrane. Feed and permeate pressures can affect permeation rates as the membrane structure can change under pressure. For example, if the membrane is stretched, then the pore size may change leading to a change in the separation factor. According to embodiments, the membrane may be asymmetrical, such that the filtering properties are different depending on the direction of gas flow. This may be based, for instance, on the permeation behaviour seen in $CO_2/CH_4$ mixtures in the cellulose acetate membrane system, for example.

Typical filtration requires use of a compressor with outputs typically in the range 5-15 bar pressure. However, according to embodiments, the biogas storage volume provides sufficient space for a large surface area of selectively permeable membrane, such as 500-10,000 $m^2$. Such a configuration offers a very low flow resistance through which the biogas constituents are enriched. Coupled with the fact that, in some instances, time is not necessarily a driving factor, molecular mass and molecule size provide a natural selective permeation process across the membrane. The enrichment process may still be enhanced through a pressure differential, but at a significantly lower levels, for instance in the 10-300 mB range.

The stretching of the membrane under moderate pressure could be used advantageously where changing or controlling the pressure in any one of the storage volumes is used to tune the separation factor between the gas constituents, and thereby used to speed up or slow down the separation process for optimization. For example, the separation factor of a particular membrane may be different from batch to batch due to variations in manufacturing process variables between manufacturers. By adjusting the relative pressure in each volume the membrane can be stretched or allowed to relax increasing or decreasing pore size respectively. As the separation factor may be strongly reliant of the average pore size, it can be adjusted accordingly. This could also solve issues of clogging due to moisture vapour, particulates etc. According to embodiments, if clogging becomes an issue, the pressure could be increased stretching the membrane and its pores to a point where the clogging is alleviated and the $H_2O$ and particulates pass through the membrane. This step could be introduced into a biogas refining operating procedure to extend the life of the membrane, including as a step in any of the anaerobic digester operations described herein. In certain aspects, a method of operating an anaerobic digester can include a step of self-cleaning through membrane stretching, e.g., by pressurized flow through one or more membranes.

In some embodiments, similar membranes and/or filters may be applied within a gas processing system, such as described in FIGS. 1-6. For instance, a membrane may act as an independent stage of those systems, or be incorporated into one or more pipes or inputs (and/or outputs) of other stages. For instance, a membrane may be placed in the gas path before or after a compressors, or before or after a pressure storage.

According to embodiments, a batch process is provided with continual refinement by moving gases through successive passes through the system. In certain aspects, the gas may move through continuously. In certain aspects, the gas is at low pressure (e.g., using a blower). In certain aspects, a compressor is not used.

Depending on the purity required for a particular purpose, the gas can be taken out at the appropriate space within the stack. The process of ultra-low pressure diffusion-enhanced molecular refinement is slow, taking place over days. This is accounted for by keeping the volume of the biogas storage container 1104 sufficiently large so as to be able to hold the biogas generation capacity of the anaerobic digester at least over a similar period.

In some embodiments, biogas that is at a higher level in the biogas storage container 1104 may be passed down to a lower level or vice versa. For instance, biogas in space 1108 and/or space 1108*a* may be fed back to space 1106. The gas may be fed back by using a low-pressure pump (which may be solar powered). Doing this causes the biogas to go through a gravitation-assisted diffusion process another time. Such additional refinement can improve the separation of methane and carbon dioxide. Because the biogas may be stored in the biogas storage container 1104 for an extended period of time (e.g., days and/or weeks) before being retrieved and processed by a mobile processing plant, there is ample time to allow for additional refinement by pumping the gas at a higher level to a lower level of the biogas storage container 1104 or vice versa.

Typical ratios of methane to carbon dioxide in raw biogas are about 60:40. In embodiments, after an extended period (e.g. to allow for the ultra-low pressure diffusion-enhanced refinement due to the semi-permeable membrane 1110), this ratio will rise to 85:15 in the upper space (i.e. first space 1108) and reduce to 35:65 methane to carbon dioxide in the lower space (i.e. second space 1106). The membrane material may be optimized to increase the first ratio (that is, the methane-to-carbon-dioxide ratio in the second space 1106) and reduce the second ratio (that is, the methane-to-carbon-dioxide ratio in the first space 1108) over the likely primary refinement and collection period. For subsequent processing by the mobile processing plant, it is advantageous to have the first space 1108 be $CH_4$ enriched (e.g. greater than 60:40 ratio, such as an 85:15 ratio or higher) and the second space 1106 be $CH_4$ depleted (e.g. less than 60:40 ratio, such as a 35:65 ratio or lower).

According to embodiments, biogas may be provided from the system 1100 to one or more of the systems and devices described with respect to FIGS. 1-6. For instance, system 1100 may act as a gas source for a compressor. It may also operate as a source for biomethane for any separation or liquefaction process described herein. The biogas provided from system 1100 may be methane-enriched, for instance, from one or more of the enriched spaces. However, it may also provide raw biogas, or filtered biogas, as required and in some embodiments. The system 1100 may be co-located with one or more renewable energy sources. In some embodiments, the biogas may be provided to the other systems from one or more of the output valves. In some embodiments, it may be provided directly (e.g., via a pipe, hose, or other connection).

According to embodiments, a system is provided for processing biogas. The system may comprise, for example, an intermittent energy source and a compressor, where the compressor is driven by the intermittent energy source. The system may also comprise a gas source, such as anaerobic digester 1100 or another source. The system may also comprise a storage tank. In embodiments, the compressor is configured to compress biogas from the gas source and generate compressed biogas, and the storage tank is configured to receive the compressed biogas. In some embodiments, the system may also include a combustion engine or pressure-driven device (e.g., a turbine), where the combustion engine or pressure-driven device is arranged to be powered by gas from the storage tank.

Figure 12:
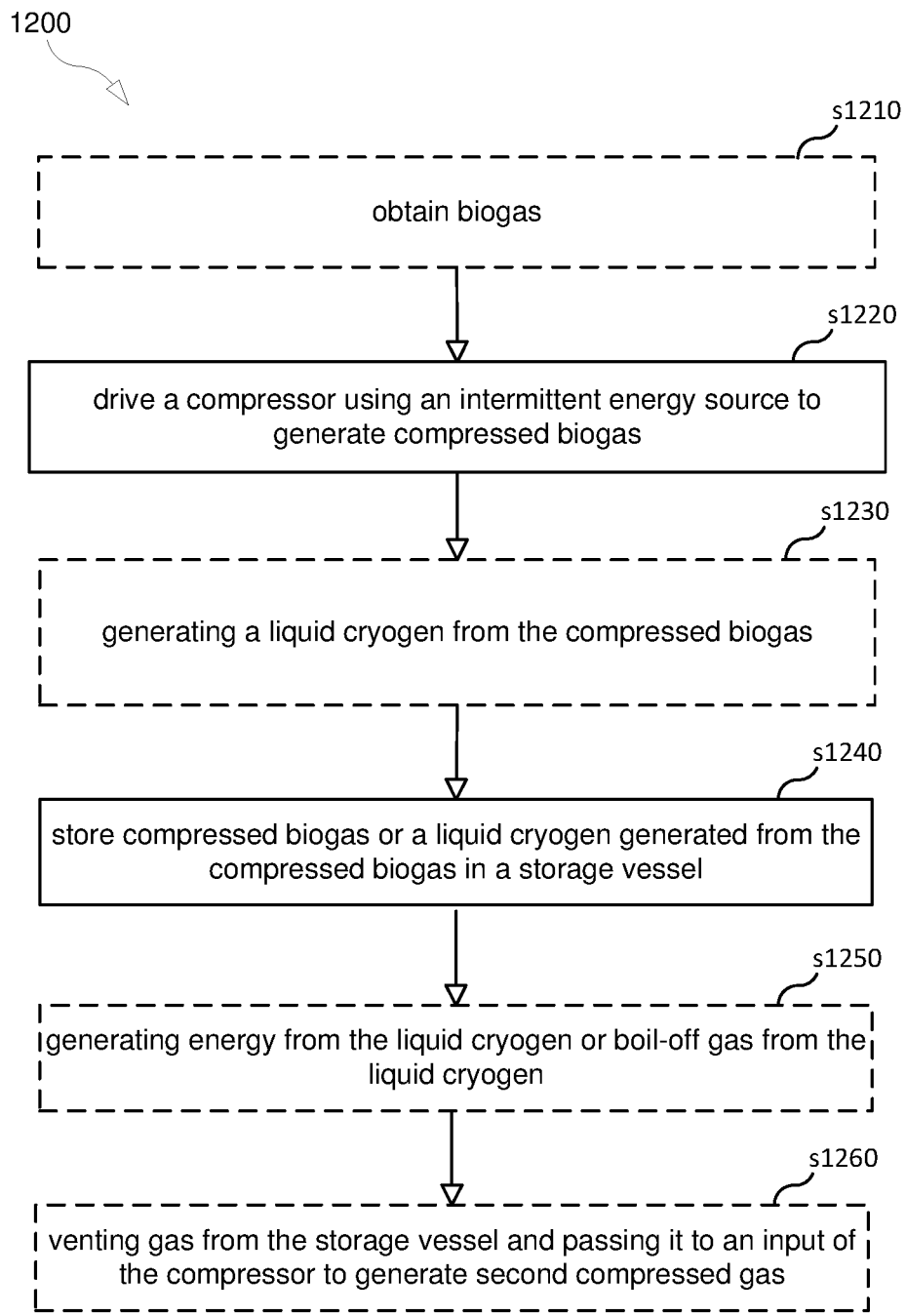
FIG. 12 illustrates a process according to embodiments.

Referring now to FIG. 12, a method 1200 for gas processing is provided according to embodiments. The process may begin, for example, with step s1210 where biogas is obtained from a gas source, such as anaerobic digester 1100. In some embodiments, the biogas is methane-enriched. In step s1220, a compressor is driven using an intermittent energy source to compress biogas from the gas source and generate compressed biogas. Step s1230 comprises generating the liquid cryogen from the compressed biogas, and may be optional in some embodiments. In step s1240, the compressed biogas or a liquid cryogen generated from the compressed biogas is stored in a storage vessel. In some embodiments, the method 1200 may further comprise generating energy from the liquid cryogen or boil-off gas from the liquid cryogen (s1250) and/or venting gas from the storage vessel and passing it to an input of the compressor to generate second compressed gas (s1260). By performing a feedback process, purity can be increased. For instance, the process may include storing a second liquid cryogen generated from the second compressed biogas in the storage vessel.

In certain aspects, the anaerobic digester 1100 operates more efficiently compared to other systems. For instance, a degree of heating is provided by the greenhouse effect enabled by the use of a clear, transparent cover 1112 (such as a plastic roof). The cover 1112 also stops rainwater from cooling the upper surface of the biogas storage container 1104. The digester's size can be varied to allow for different anaerobic digestion timescales. For instance, the digester can be made sufficiently large to allow for a very slow, long anaerobic digestion process. This can result in a more efficient conversion of biomass material to biogas. For example, a retention period of 200 days can be accommodated. Such a period aligns with the annual digestate management period for a typical dairy farm, whereas the standard industrial scale anaerobic digester would have a retention period of about 40 days. The digester design also removes the requirement for stirring systems, which can be complicated, unreliable, and power hungry. According to some embodiments, one or more of the permeable membranes is removable, such that they can be periodically cleaned or replaced.

Additionally, much of the gas refinement is carried out slowly, at low pressure, enhanced by diffusion through the use of a simple semi-permeable membrane before final refinement using a fast, high-pressure system. This two-stage refinement improves the overall energy efficiency of the gas refinement process. Additionally, in embodiments, there is no investment required by the owner of the anaerobic digester for biogas processing and liquefaction equipment. Because the digester can be used with the mobile biogas processing plant, the costs required for such processing can be spread to a purchaser of the excess biogas, thereby enabling small- to mid-sized farms the ability to economically utilize anaerobic digestion. Further, because the anaerobic digester provides other benefits (discussed above) in addition to any revenue that may result from sale of excess biogas, a farm owner looking to install this equipment need not focus solely on the gas production rate to determine the value of investment in this equipment. Any revenue from gas sales would be a bonus on top of the other available benefits. Also, the investment case for the biogas processing plant is also different. The costs of the biogas processing plant, because it is mobile, may be spread out among the purchasers of biogas or the multiple farms that may utilize a single mobile biogas processing plant. Additionally, because the plant is mobile, it can effectively be in use continuously (apart from travel time), which also improves the investment case for such a plant.

In conventional wind turbines that generate electricity directly there is a problem matching the rotational speed of the turbine with the requirements of the generator. Normally this is achieved by the use of a gearbox. The ratio is of this gearbox is selected to maximize the energy output over a given period. What this means is that at high wind speeds the output of the electrical generator is compromised. If a compressor is used, then the drive can be direct and power obtained over the full range of wind speeds. It should be noted that the power output of a wind turbine increases as the cube of the wind velocity so there is a lot to gain, particularly where there are high gusts of wind.

Further examples:

A1. An energy capture system, comprising:
one or more rotor blades;
a compressor, wherein the compressor is configured to be driven by the rotator blade(s) to draw gas (e.g., air, methane, or nitrogen) and compress the gas;
a pressure receiver coupled to the output of the compressor and configured to receive compressed gas (or liquid) from the compressor; and
an energy recovery unit (e.g., expander or pressure gas motor) coupled to the pressure receiver and configured to receive compressed gas from the pressure receiver (e.g., via a regulator or relief valve of the pressure receiver), wherein the energy recover unit generates mechanical and/or electrical energy (e.g., via a turbine or engine) using the compressed gas.

A2. The system of A1, wherein compressor is a rotary action compressor and the rotor blade(s) is fixed to the drive shaft of the compressor.

A3. The system of A1 or A2, wherein the compressor is a rotary vane compressor or reciprocating compressor.

A4. The system of any of A1-A3, wherein the mast of a support for the rotor blade(s) comprises the pressure receiver.

A5. The system of any of A1-A4, wherein the one or more rotor blades are part of an array of wind turbines.

A6. The system of any of A1-A5, wherein the system comprises a plurality of air mills each having their own compressors and pressure receivers, wherein the air mills are coupled to a single master expander (or other master recovery unit).

A7. The system of A6, further comprises a plurality of non-return valves interposed between each air mill and the master recovery unit.

A8. The system of any of A1-A8, wherein at least one blade (or the pressure receiver) has a first side that is black to absorb sunlight and a second side that is shrouded in an insulator (the added heat can be added to the compressed gas before entering the recovery stage to improve efficiency).

B1. A method for energy recovery, comprising the steps of:
using one or more rotor blades of a wind energy system to drive a compressor;
providing compressed gas from the compressor to a pressure receiver; and
recovering energy (e.g., via turbine or engine) using compressed gas from the pressure receiver.

B2. The method of B1, further comprising heating the gas (or maintaining gas temperatures in the receiver (e.g., before passing to an energy recovery unit).

B3. The method of B1 or B2, further comprising liquefying compressed gas (e.g., using a Joule Thompson expansion process).

C1. An energy capture system, comprising:
one or more solar cells;
a compressor, wherein the compressor is powered by the solar cell(s) to draw gas (e.g., air, methane, or nitrogen) and compress the gas;
a pressure receiver coupled to the output of the compressor and configured to receive compressed gas (or liquid) from the compressor; and
an energy recovery unit (e.g., expander or pressure gas motor) coupled to the pressure receiver and configured to receive compressed gas from the pressure receiver (e.g., via a regulator or relief valve of the pressure receiver),
wherein the energy recover unit generates mechanical and/or electrical energy (e.g., via a turbine or engine) using the compressed gas.

C2. The system of C1, further comprising an electric motor between the solar cell(s) and the compressor.

C3. The system of C1 or C2, wherein the one or more solar cells comprise an array of solar cells whose outputs are combined and provided to a master compressor (e.g., the compressor is a master compressor for the array) and further provided to a master recovery unit (e.g., the recovery unit is a master recovery unit for the array).

C4. The system of any of C1-C3, wherein the one or more solar cells comprise a film of partially transparent fluid running over the photovoltaic cells' surface absorbing some of the otherwise lost solar energy (which can be added to the compressed gas before entering the recovery stage to improve efficiency).

D1. A method for energy recovery, comprising the steps of:
using one or more solar cells to drive a compressor;
providing compressed gas from the compressor to a pressure receiver; and
recovering energy (e.g., via turbine or engine) using compressed gas from the pressure receiver.

D2. The method of D1, further comprising:
before recovery the energy, adding heat to the compressed gas.

D3. The method of D2, wherein the added heat is waste heat from the one or more solar cells.

E1. A system comprising:
a renewable and intermittent energy source (e.g., wind, solar, tidal);
a liquefier configured to generate a first cryogen (e.g., LN2) using energy from the renewable source;
first cryogen storage;
a liquefaction stage for generating a second cryogen (e.g., gaseous or liquid methane) from biogas and using the first cryogen;
second cryogen storage;
a first power generation stage configured to generate electricity using the second cryogen, wherein the power generation stage generates heat waste; and
a second power generation stage (e.g., comprising an expander) that generates mechanical and/or electrical power using a gas (e.g., from the first or second cryogen storage or liquefaction stages) and the heat waste.

E2. The system of E1, further comprising a heat store for storing the heat waste.

E3. They system of E1 or E2, further comprising a heat exchanger to couple the heat waste to the power generation stage (e.g., via the heat exchanger and heat store).

E4. The system of any of E1-E3, wherein the heat waste is provided in real time (e.g., to the second power generation stage) to directly enhance the power recovery process on a continuous basis.

F1. An energy capture and generation method, comprising the steps of:
generate and store a first cryogen using a renewable and intermittent energy source;
generate and store a second cryogen using biogas and the first cryogen;
generate electricity using the second cryogen; and
generate electricity using gas from a cryogen store and heat waste from the first electricity generation step.

G1. A method for energy capture and generation, comprising:
generating energy (e.g., using wind, solar, or tidal);
creating a first cryogenic material (e.g., liquid nitrogen) using the energy;
processing biogas to create a second cryogenic material (e.g. liquid methane or CO2); and
using second cryogenic material to power an engine.

H1. A method for energy capture and generation, comprising:
generating a cryogenic material using intermittent renewable energy (e.g., liquid air or nitrogen from solar, wind, or tidal);
generating electricity and heat waste (e.g. from a combustion engine burning a fuel, such as methane or carbon-based fuel);

passing the cryogenic material through a heat expander using the heat waste (e.g., to increase the energy of pressurize gas); and using the high-energy pressurized gas to generate power (e.g., mechanical and/or electrical power).

While various embodiments of the present disclosure are described herein, it should be understood that they have been presented by way of example only, and not limitation. Thus, the breadth and scope of the present disclosure should not be limited by any of the above-described exemplary embodiments. Moreover, any combination of the above-described elements in all possible variations thereof is encompassed by the disclosure unless otherwise indicated herein or otherwise clearly contradicted by context.

Additionally, while the processes described above and illustrated in the drawings are shown as a sequence of steps, this was done solely for the sake of illustration. Accordingly, it is contemplated that some steps may be added, some steps may be omitted, the order of the steps may be re-arranged, and some steps may be performed in parallel.

The invention claimed is:

1. A gas processing system, comprising:
an intermittent energy source;
a compressor configured to draw biogas and produce a compressed material from the biogas, wherein the compressor is powered by the intermittent energy source;
a liquefaction element configured to generate a liquid cryogen from the compressed material;
a storage vessel configured to store the liquid cryogen generated by the liquefaction element; and
an energy recovery unit coupled to the storage vessel and configured to receive an output from the storage vessel, wherein the energy recovery unit is configured to generate energy using the output.

2. The system of claim 1, wherein the intermittent energy source is one of a wind, solar, or tidal energy source.

3. The system of claim 1, wherein the liquid cryogen is methane.

4. The system of claim 1, wherein the energy recovery unit is configured to generate one or more of mechanical or electrical energy using the output.

5. The system of claim 4, wherein the energy recovery unit is configured to generate energy via a turbine.

6. The system of claim 4, wherein the energy recovery unit is a pneumatic motor.

7. The system of claim 4, wherein the output used by the energy recovery unit is boil-off gas derived from the compressed material.

8. The system of claim 1, wherein the intermittent energy source comprises at least one rotor blade, the compressor comprises a drive shaft, and the rotor blade is attached to the drive shaft of the compressor.

9. The system of claim 8, wherein the compressor is a rotary vane compressor or a reciprocating compressor.

10. The system of claim 1, further comprising:
a gas source;
wherein the compressor is configured to draw the biogas from the gas source.

11. The system of claim 10, wherein the gas source is an anaerobic digester.

12. The system of claim 11, wherein the anaerobic digester comprises one or more semi-permeable membranes and the biogas is methane-enriched biogas.

13. The system of claim 1, wherein the liquid cryogen is liquid methane and the liquid methane is stored in the storage vessel.

14. The system of claim 1, wherein the liquefaction element is disposed at least partially within the storage vessel.

15. The system of claim 1, wherein the liquefaction element comprises a heat exchanger and an orifice.

16. A gas processing method, comprising:
driving a compressor using an intermittent energy source to compress biogas from a gas source and generate compressed gas;
generating a liquid cryogen from the compressed gas;
storing the liquid cryogen generated from the compressed gas in a storage vessel; and
generating energy from the liquid cryogen.

17. The method of claim 16, wherein the gas source is an anaerobic digester comprising at least one semi-permeable membrane and the biogas is methane-enriched biogas.

18. The method of claim 16, further comprising:
generating energy from the liquid cryogen or boil-off gas from the liquid cryogen.

19. The method of claim 16, wherein the compressed gas or liquid cryogen is methane.

20. The method of claim 16, wherein generating the liquid cryogen comprises passing the compressed gas through a heat exchanger to generate liquid methane.

* * * * *